(12) United States Patent
Ueno et al.

(10) Patent No.: US 6,757,016 B1
(45) Date of Patent: Jun. 29, 2004

(54) IMAGE PICKUP APPARATUS WITH COLOR FILTER ARRAY AND MEANS FOR ADDING AND SUBTRACTING SIGNALS

(75) Inventors: Isamu Ueno, Hadano (JP); Shigetoshi Sugawa, Atsugi (JP); Katsuhisa Ogawa, Machida (JP); Toru Koizumi, Yokohama (JP); Tetsunobu Kochi, Hiratsuka (JP); Katsuhito Sakurai, Machida (JP); Hiroki Hiyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/219,754

(22) Filed: Dec. 23, 1998

(30) Foreign Application Priority Data

Dec. 26, 1997 (JP) .............................................. 9-361086
Jul. 28, 1998 (JP) ........................................... 10-212434

(51) Int. Cl.[7] .......................... H04N 3/14; H04N 5/335; H04N 9/04; H04N 9/083
(52) U.S. Cl. ..................................... 348/279; 348/222.1
(58) Field of Search ................................ 348/279, 308, 348/281, 278, 277, 222.1

(56) References Cited

U.S. PATENT DOCUMENTS

| | | | | |
|---|---|---|---|---|
| 4,591,900 A | * | 5/1986 | Heeb et al. ................. 348/277 |
| 4,847,684 A | * | 7/1989 | Eino ........................... 348/279 |
| 5,136,370 A | * | 8/1992 | Chi ............................. 348/279 |
| 5,202,756 A | * | 4/1993 | Sasaki et al. ................ 348/279 |
| 5,262,870 A | | 11/1993 | Nakamura et al. .......... 358/212 |
| 5,506,618 A | * | 4/1996 | Yoneyama et al. ......... 348/279 |
| 5,568,192 A | | 10/1996 | Hannah ....................... 348/222 |
| 5,614,947 A | | 3/1997 | Tanizoe et al. .............. 348/241 |
| 5,631,703 A | * | 5/1997 | Hamilton et al. ........... 348/279 |
| 5,724,450 A | * | 3/1998 | Chen et al. .................. 382/235 |
| 5,745,171 A | * | 4/1998 | Ogawa et al. ............... 348/279 |
| 6,035,077 A | * | 3/2000 | Chen et al. .................. 382/312 |
| 6,160,593 A | * | 12/2000 | Nakakuki .................... 348/279 |
| 6,285,398 B1 | * | 9/2001 | Shinsky et al. ............. 348/279 |
| 6,343,147 B2 | * | 1/2002 | Yamamoto ................... 382/167 |

FOREIGN PATENT DOCUMENTS

| | | | |
|---|---|---|---|
| EP | 0 813 343 A1 | 12/1997 | |
| JP | 9-312848 | 12/1997 | |
| JP | 10336486 | 12/1998 | ............ H04N/5/14 |

OTHER PUBLICATIONS

Office Action (in Chinese and in English) from counterpart application 98124080.1 from Patent Office in China, dated Jul. 18, 2003.

* cited by examiner

Primary Examiner—Wendy R. Garber
Assistant Examiner—Matthew L Rosendale
(74) Attorney, Agent, or Firm—Fitzpatrick, Cella, Harper & Scinto

(57) ABSTRACT

To provide an image pickup apparatus that generates an image signal having a high resolution both horizontally and vertically, the filter arrangement for a color filter array used in the apparatus is so designed that the colors of the filters in a cyclic patterned unit of N rows×N columns (4 lines×4 columns) differ from each other not only on the same line but also in the same column. Thus, from all the pixel blocks, pixel signals for each predetermined pixel block unit can be obtained that are required for the generation of a luminance signal and of color signals.

6 Claims, 20 Drawing Sheets

|    | C1  | C2  | C3  | C4  |
|----|-----|-----|-----|-----|
| L1 | G1  | Ye1 | Cy2 | Mg2 |
| L2 | Cy1 | Mg1 | G2  | Ye2 |
| L3 | Ye3 | G3  | Mg4 | Cy4 |
| L4 | Mg3 | Cy3 | Ye4 | G4  |

FIG. 1

|    | C1 | C2 | C3 | C4 |
|----|----|----|----|----|
| L1 | Cy | Ye | Cy | Ye |
| L2 | Mg | G  | Mg | G  |
| L3 | Cy | Ye | Cy | Ye |
| L4 | G  | Mg | G  | Mg |
| L5 | Cy | Ye | Cy | Ye |

FIG. 2

|    | C1 | C2 |
|----|----|----|
| L1 | Cy | Y  |
| L2 | Mg | G  |
| L3 | Cy | Ye |
| L4 | Mg | G  |
| L5 | Cy | Ye |
| L6 | G  | Mg |
| L7 | C  | Ye |
| L8 | G  | Mg |

FIG. 4

|    | C1  | C2  | C3  | C4  |
|----|-----|-----|-----|-----|
| L1 | G1  | Ye1 | Cy2 | Mg2 |
| L2 | Cy1 | Mg1 | G2  | Ye2 |
| L3 | Ye3 | G3  | Mg4 | Cy4 |
| L4 | Mg3 | Cy3 | Ye4 | G4  |

FIG. 5

|    | C1  | C2  | C3  | C4  |
|----|-----|-----|-----|-----|
| L1 | G1  | Ye1 | Cy2 | Mg2 |
| L2 | Cy1 | Mg1 | G2  | Ye2 |
| L3 | Mg3 | Cy3 | Ye4 | G4  |
| L4 | Ye3 | G3  | Mg4 | Cy4 |

FIG. 6

| G1  | Ye1 | Mg2 | Cy2 |
|-----|-----|-----|-----|
| Mg1 | Cy1 | G2  | Ye2 |
| Cy3 | G3  | Ye4 | Mg4 |
| Ye3 | Mg3 | Cy4 | G4  |

FIG. 7

| G1  | Ye1 | Mg2 | Cy2 |
|-----|-----|-----|-----|
| Mg1 | Cy1 | G2  | Ye2 |
| Ye3 | Mg3 | Cy4 | G4  |
| Cy3 | G3  | Ye4 | Mg4 |

IMAGE PICKUP APPARATUS WITH COLOR FILTER ARRAY AND MEANS FOR ADDING AND SUBTRACTING SIGNALS

BACKGROUND OF THE INVENTION

1. Field of the Invention

The present invention relates to an image pickup apparatus that can obtain an image having a high resolution.

2. Related Background Art

In a conventional image pickup apparatus for generating an image signal, object light enters via a color filter (a filter array) and impinges on a light-receiving face composed of a plurality of photodiodes (hereinafter referred to as "pixels" or "light detectors").

The color filter types available comprise a primary color filter and a complementary color filter. A primary color filter is an array in which filters for the three primary colors, red (R) and green (G) and blue (B), are positioned at individual pixels in a predetermined order on the light receiving face. Similarly, a complementary color filter is an array in which color filers for four complementary colors, cyan (Cy), yellow (Ye), magenta (Mg) and green (G) are arranged in a predetermined order.

The processing performed in accordance with a signal obtained by the image pickup apparatus will now be described, while the color filer used for the apparatus is, for example, the above described complementary color filter.

First, a cyan filter absorbs red light within a visible radiation range, and a yellow filter absorbs blue light within a visible radiation range. Whereas while a magenta filter absorbs green light within a visible radiation range a green filter transmits only green light.

The arrangements used for these color filters will be described later.

The image pickup apparatus, wherein object light enters through the complementary color filter array, obtains a pixel signal Cy that corresponds to the volume of the light that strikes a pixel after passing through the cyan filter, a pixel signal Ye that corresponds to the volume of the light that strikes a pixel after passing through the yellow filter, a pixel signal Mg that corresponds to the volume of the light that strikes a pixel after passing through the magenta filter, and a pixel signal G that corresponds to the volume of the light that passes through the green filter.

The thus obtained pixel signals Cy, Ye, Mg and G are used, as luminance signal Y and color difference signals CB and CR, for adjusting the iris or the white balance for a digital still camera or for a detection process performed during auto focusing, or for an image pickup apparatus that performs compression or decompression processing.

The luminance signal Y and the color difference signals CB and CR are represented by the following equations (1) to (3), in which the pixel signals Cy, Ye, Mg and G are used.

$$Y = Ye + G + Cy + Mg \quad (1)$$

$$CB = (G + Ye) - (Mg + Cy) \quad (2)$$

$$CR = (Cy + G) - (Ye + Mg) \quad (3)$$

In FIGS. 1 and 2 are shown example arrangement patterns for color filters in a complementary filter used for an image pickup apparatuses.

In the pattern shown in FIG. 1 for the complementary color filter, color filters are so arranged that they have a cyclic pattern of two pixels horizontally (the direction corresponding to that of C1, C2, C3, . . . ) and four pixels vertically (the direction corresponding to that of L1, L2, L3, . . . ). In the pattern shown in FIG. 2 for the complementary color filter, color filters are so arranged that they have a cyclic pattern of two pixels horizontally and eight pixels vertically.

With either complementary color filter, the luminance signal Y is obtained by performing the calculations for equation (1), for which are used the pixel signals Cy, Ye, Mg and G (shaded portions in FIGS. 23 and 24) for pixels in a four-pixel (2×2) block including two pixels horizontally and two pixels vertically. Similarly, the color difference signals CB and CR can be obtained by performing the calculations for equations (2) and (3) that employ the pixel signals Cy, Y, Mg and G for pixels in a 2×2 pixel block.

However, when a conventional image pickup apparatus, for which object light enters through the color filter shown in FIG. 1 or 2, is employed for a digital still camera, for example, the following problems have arisen.

(1) Before the shutter release is pressed, at the cost of resolution, a digital still camera reads pixel signals (in this case the above described image signals Cy, Ye, Mg and G) that are obtained by the image pickup apparatus (fast read mode), and based on these signals, displays images on the screen of a liquid crystal viewfinder or adjusts the iris or the white balance.

When the color filter shown in FIG. 2 is employed for an image pickup apparatus, image pixels obtained by the image pickup apparatus can be read in the fast read mode, and the white balance can be adjusted based on the signals. However, when the color filter shown in FIG. 1 is employed for an image pickup apparatus, and when for fast reading, at the cost of resolution, pixel signals for individual pixels are intermittently read vertically, only pixel signals Cy and Ye, i.e., pixel signals for only the two colors cyan and yellow, can be obtained, and the processing for white balance can not be employed.

(2) Recently, an image pickup apparatus, such as a CCD, has been provided wherein, by employing an elaborate signal reading method, object light is received at the light receiving face and pixel signals for two pixels that are perpendicularly adjacent to the light receiving face are added together, the resultant signal being transmitted to the transmission unit of the apparatus. As a result, the image pickup apparatus outputs paired pixel signals.

Specifically, when the color filter in FIG. 1 is employed for an image pickup apparatus, for lines L1 and L2 paired pixel signals Cy, for a pixel that is positioned at (C1, L1), and Mg, for a pixel that is positioned at (C1, L2), are output first, and then paired pixel signals Ye, for a pixel that is positioned at (C2, L1), and G, for a pixel that is positioned at (C2, L2), are output, the pixel signal pairs being sequentially output in the same way. And when the output of signals for lines L1 and L2 has been completed, for the succeeding lines L3 and L4 paired pixel signals Cy, for a pixel that is positioned at (C1, L3), and G, for a pixel that is positioned at (C1, L4), are output first, and then paired pixel signals Ye, for a pixel that is positioned at (C2, L3), and Mg, for a pixel that is positioned at (C2, L4), are output, the pixel signal pairs again being sequentially output in the same way, and the output of signals for the lines L3 and L4 is completed.

That is, the pixel signals output for lines L1 and L2 are (Cy+Mg), (Ye+G), . . . , and the pixel signals output for lines L3 and L4 are (Cy+G), (Ye+Mg), . . . .

However, since luminance signal Y and color difference signals CB and CR are acquired from the above output signals, there are signals that can not be used for the calculations performed using equations (2) and (3) to obtain color difference signals CB and CR.

That is, while equation (2) is set up using (G+Ye) and (Mg+Cy), the output signals for lines L3 and L4 are (Cy+G), (Ye+Mg), . . . , and as a result, the calculations for which equation (2) is used can not be performed for lines L3 and L4. Similarly, while equation (3) is set up using (Cy+G) and (Ye+Mg), the output signals for lines L1 and L2 are (Cy+Mg), (Ye+G), . . . , and as a result, the calculations for which equation (3) is used can not be performed for lines L1 and L2.

As is described above, a solution for equation (2) can be obtained for the outputs for lines L1 and L2, but no solution can be obtained for the outputs for lines L3 and L4. Likewise, a solution for equation (3) can be obtained for the outputs for lines L3 and L4, but no solution can be obtained for the outputs for lines L1 and L2.

Therefore, color signals CB and CR for the individual colors can be obtained only for the pixel signals for one line, although pixel signals are output for four lines by the image pickup apparatus. That is, since luminance signal Y and color signals CB and CR can not be obtained unless pixel signals for four lines are employed, accordingly, vertical resolution is reduced.

When the color filter shown in FIG. 2 is employed for the image pickup apparatus, pixel signal pairs are output in the same manner: pixel signal pairs of (Cy+Mg), (Ye+G), . . . for lines L1 and L2; pixel signal pairs of (Cy+Mg), (Ye+G), . . . for lines L3 and L4; pixel signal pairs of (Cy+G), (Ye+Mg), . . . for lines L5 and L6; and pixel signal pairs of (Cy+G), (Ye+Mg), . . . for lines L7 and L8.

However, since luminance signal Y and color signals CB and CR are acquired from the above output signals, there are signals for which equations (2) and (3), used to obtain color signals CB and CR, can not be solved.

That is, while equation (2) is set up using (G+Ye) and (Mg+Cy), the output signals for lines L5, L6, L7 and L8 are (Cy+G), (Ye+Mg), . . . As a result, a solution for equation (2) can not be obtained for these lines. Similarly, while equation (3) is set up using (Cy+G) and (Ye+Mg), the output signals for lines L1, L2, L3 and L4 are (Cy+Mg), (Ye+G), As a result, a solution for equation (3) can not be obtained for these lines.

As is described above, a solution for equation (2) can be obtained for the outputs for lines L1 to L4, but can not be obtained for the outputs for lines L5 to L8. Likewise, a solution for equation (3) can be obtained for the outputs for lines L5 to L8, but can not be obtained for the outputs for lines L1 to L4.

Therefore, color difference signals CB and CR for the individual colors can be obtained only for pixel signals for two lines, although pixel signals are output for eight lines by the image pickup apparatus. That is, since luminance signal Y and color difference signals CB and CR can not be obtained unless pixel signals for four lines are employed, accordingly, vertical resolution is reduced.

SUMMARY OF THE INVENTION

It is one objective of the present invention to generate an image signal that has a high resolution, both horizontally and vertically.

It is another objective of the present invention to efficiently acquire a color image signal having a high resolution.

It is an additional objective of the present invention to provide multiple modes, such as a mode for outputting a low-resolution image signal at a high speed and a mode for outputting a high-resolution image signal at a low speed, for an easy color display, for auto-focusing and for the automatic adjustment of the white balance.

To achieve the above objectives, according to one aspect of the present invention, an image pickup apparatus comprises:

a plurality of pixels arranged horizontally and vertically; and a color filter array for four colors arranged in the plurality of pixels, wherein the color filter array has a cyclic pattern of four lines×four columns, and wherein, in the cyclic pattern unit comprising four rows and four columns, colors of color filters on the same row differ from each other and colors of the color filters in the same column differ from each other.

According to one more aspect of the present invention, an image pickup apparatus comprises:

a plurality of pixels arranged horizontally and vertically; and a color filter array of N colors (N is an integer) arranged in the plurality of pixels, wherein the color filter array is so arranged that luminance signals are generated from all the rows and all the columns.

According to another aspect of the present invention, an image pickup apparatus comprises:

a plurality of pixels arranged horizontally and vertically; and a color filter array of four colors arranged in the plurality of pixels, wherein the color filter array is so arranged that two color difference signals are generated by a cyclic pattern of two rows x two columns by using addition signals of pixels in the horizontal direction and by using addition signals of pixels in the vertical direction.

According to an additional aspect of the present invention, an image pickup apparatus comprises:

a plurality of pixels arranged horizontally and vertically;

a plurality of vertical output lines along which signals produced by the plurality of pixels are read;

a plurality of storage means, provided along the vertical output lines, for the storage of the signals produced by the plurality of pixels;

first addition means, provided along the vertical output lines, for adding together signals produced by pixels on the same row that are output by the plurality of storage means;

second addition means, provided along the vertical output lines, for adding together signals produced by pixels in the same column that are output by the plurality of storage means; and a horizontal output line along which are read resultant signals produced by the first addition means and the second addition means.

According to a further aspect of the present invention, an image pickup apparatus comprises:

a plurality of pixels arranged horizontally and vertically; and addition means for adding together pixels that are located adjacent to each other horizontally and/or vertically, while shifting the plurality of pixels by one pixel.

According to one further aspect of the present invention, an image pickup apparatus comprises:

a plurality of pixels arranged horizontally and vertically;

readout means for reading out signals produced by the plurality of pixels as a unit, comprising a pixel block that is composed of P lines×Q columns (P and Q are integers), while shifting the plurality of pixels horizontally or/and vertically by one pixel or predetermined number of pixels; and saving means for saving signals produced in an area that overlaps the next pixel block that is shifted the predetermined number of pixels away from the pixel block in the area of the pixel block that is read by the readout means, wherein the readout means employs the signals stored in the saving means to read a succeeding pixel block.

According to yet one more aspect of the present invention, a method for reading an image signal produced by an image pickup apparatus in which four color filters are disposed, comprises the step of:

calculating A+B−C−D for signals A, B, C and D produced by pixels at which are positioned the four color filters, wherein pixels from which signals A and B are output are located adjacent to each other horizontally or vertically; and wherein the color filters have a cyclic pattern of four rows×four columns, and, in the cyclic pattern of four lines and four columns, colors of color filters on the same row differ from each other and colors of the color filters in the same column differ from each other.

According to yet another aspect of the present invention, a method for reading an image signal produced by an image pickup apparatus in which four color filters are disposed, comprises the step of:

calculating A+B−C−D for signals A, B, C and D produced by pixels at which are positioned the four color filters, wherein pixels from which signals A and B are output are located adjacent to each other horizontally or vertically; and wherein the color filters have a cyclic pattern of four rows×four columns, and are so arranged that luminance signals are generated from all the rows and all the columns.

According to yet an additional aspect of the present invention, a method for reading an image signal produced by an image pickup apparatus in which four color filters are disposed, comprises the step of:

calculating A+B−C−D for signals A, B, C and D produced by pixels at which are positioned the four color filters, wherein pixels by which signals A and B are output are located adjacent to each other horizontally or vertically; and wherein the color filters are so arranged that two color difference signals are generated by a cyclic pattern of two rows×two columns by using addition signals of pixels in the horizontal direction and by using addition signals of pixels in the vertical direction.

According to yet a further aspect of the present invention, an image processing system comprises:

an image pickup apparatus in which is mounted a color filter array for four colors;

a compressor for compressing data;

a decompressor for decompressing compressed data; and a color processor for at the least performing an adjustment for white balance or for γ correction, wherein a signal from the image pickup apparatus is transmitted to the compressor without passing through the color processor, and a signal compressed by the compressor is decompressed by the decompressor, the resultant signal being transmitted to the color processor;

wherein the color filter array has a cyclic pattern of four rows×four columns; and wherein, in the cyclic pattern of four lines and four columns, colors of color filters on the same row differ from each other and colors of the color filters in the same column differ from each other.

According to yet one further aspect of the present invention, an image processing system comprises:

an image pickup apparatus in which is mounted a color filter array for N colors (N is an integer);

a compressor for compressing data;

a decompressor for decompressing compressed data; and a color processor for at the least performing an adjustment for a white balance or for γ correction, wherein a signal from the image pickup apparatus is transmitted to the compressor without passing through the color processor, and a signal compressed by the compressor is decompressed by the decompressor, the resultant signal being transmitted to the color processor; and wherein the color filter array is so arranged that luminance signals are generated from all the rows and all the columns.

According to still one more aspect of the present invention, an image processing system comprises:

an image pickup apparatus in which is mounted a color filter array for N colors (N is an integer);

a compressor for compressing data;

a decompressor for decompressing compressed data; and a color processor for at the least performing an adjustment for white balance or for γ correction, wherein a signal from the image pickup apparatus is transmitted to the compressor without passing through the color processor, and a signal compressed by the compressor is decompressed by the decompressor, the resultant signal being transmitted to the color processor; and wherein the color filter array is so arranged that two color difference signals are generated for a cyclic pattern of two rows×two columns by using addition signals of pixels in the horizontal direction and by using addition signals of pixels in the vertical direction.

Other objectives and features of the present invention will become apparent during the course of the explanation given while referring to the following specifications and drawings.

With the above described arrangement, an image of high quality can be obtained.

BRIEF DESCRIPTION OF THE DRAWINGS

FIG. 1 diagram for explaining a conventional color filter array that has a cyclic pattern of two pixels horizontally and four pixels vertically;

FIG. 2 is a diagram for explaining a conventional color filter array that has a cyclic pattern of two pixels horizontally and eight pixels vertically;

FIG. 4 is a diagram for explaining an example array of color filters employed by the image pickup apparatus;

FIG. 5 is a diagram for explaining another example array of color filters employed by the image pickup apparatus;

FIG. 6 is a diagram for explaining an example array of color filters employed by an image pickup apparatus according to a second embodiment of the present invention;

FIG. 7 is a diagram for explaining another example array of color filters employed by the image pickup apparatus;

DETAILED DESCRIPTION OF THE PREFERRED EMBODIMENTS

The preferred embodiments of the present invention will now be described while referring to the accompanying drawings.

First Embodiment

Figure 3:
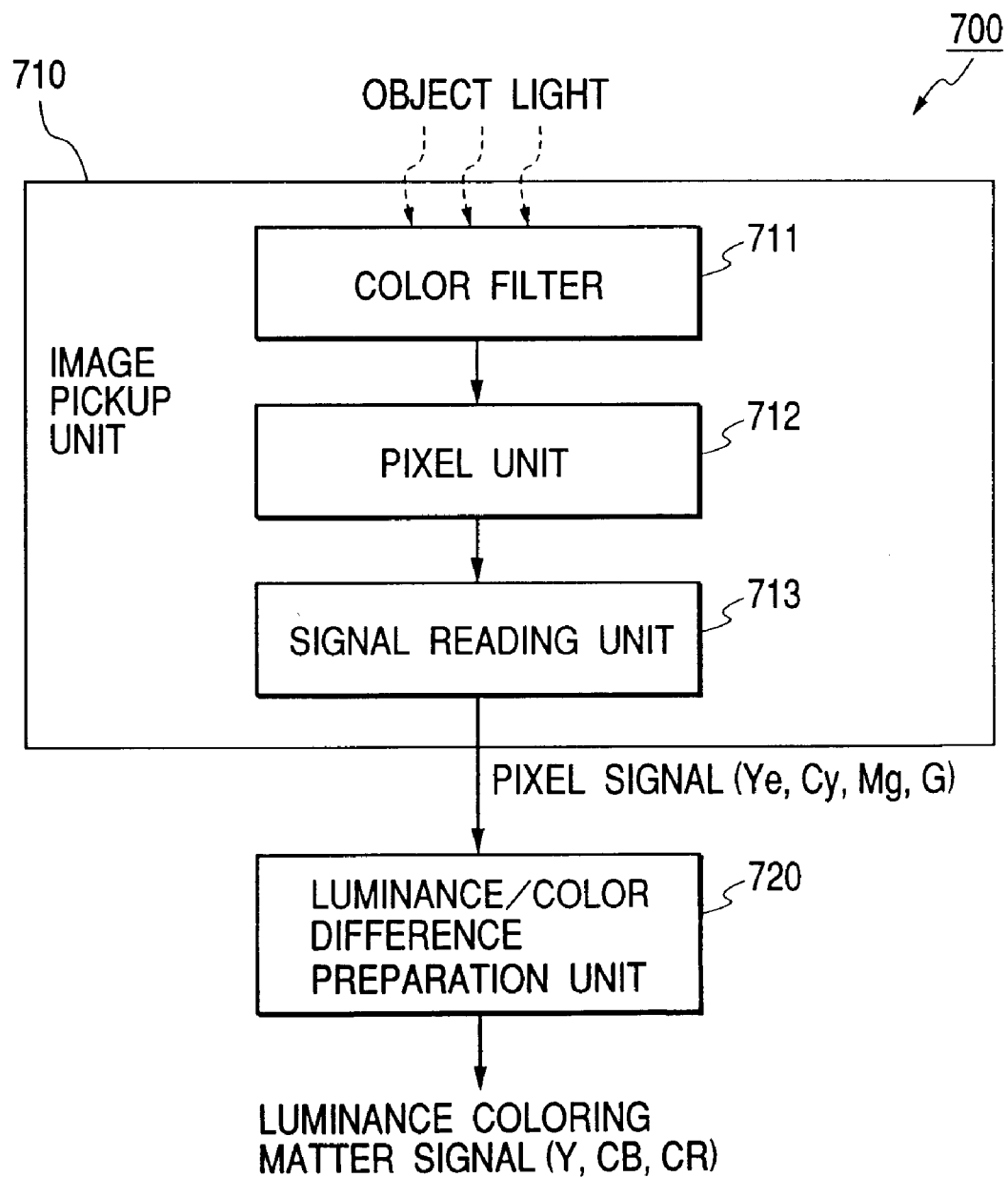
FIG. 3 is a block diagram illustrating the arrangement of an image pickup apparatus according to a first embodiment of the present invention.

The present invention is applied, for example, to an image pickup apparatus 700 shown in FIG. 3.

The image pickup apparatus 700 is provided in a digital still camera, etc., and comprises: an image pickup unit 710, for outputting a pixel signal obtained from an incident object light; and a luminance/color difference preparation unit 720 for generating luminance signal Y and color difference signals CB and CR using pixel signals received from the image pickup unit 710.

The image pickup unit 710 includes a color filter 711, a pixel unit 712 for receiving object light that passes through the color filter 711, and a signal reading unit 713 for reading a pixel signal obtained at the pixel unit 712. The pixel signal read at the signal reading unit 713 is transmitted to the luminance/color difference preparation unit 720.

The image pickup unit 710 employs, as the color filter 711, four complementary color filters for yellow (Ye), cyan (Cy), magenta (Mg) and green (G), which will be described later in detail. Therefore, the pixel unit 712 obtains four complementary color pixel signals Ye, Cy, Mg and G. These pixel signals are read by the pixel reading unit 713 and are transmitted to the luminance/color difference preparation unit 720.

The luminance/color difference preparation unit 720 obtains luminance signal Y and color difference signals CB and CR by employing the pixel signals Ye, Cy, Mg and G received from the image pickup unit 710. The luminance signal Y, which is also used as an auto focus detection signal, and color difference signals CB and CR are used to display images, at a low resolution, in a liquid crystal viewfinder of a digital still camera and to adjust the iris and the white balance of the camera. The image pickup unit 710 and the luminance/color difference preparation unit 720 may either be mounted on the same IC chip, or on separate IC chips.

The most important feature of the above described image pickup apparatus is the image pickup unit 710. A specific explanation will now be given for the image pickup unit 710.

First, the structure of the color filter 711 will be explained.

In FIG. 4 is shown the filter arrangement (pattern) for the color filter (complementary color filter) 711 in FIG. 3.

As is shown in FIG. 4, the color filter 711 is a filter array that has a cyclic pattern of four pixels horizontally and four pixels vertically. In the thus arranged color filter 711, on the first line L1, starting at the left, color filters G1, Ye1, Cy2 and Mg2 are arranged; on the second line L2, which is rotated two columns to the left relative to the first line L1, starting at the left, color filters Cy1, Mg1, G2 and Ye2 are arranged; on the third line L3, starting at the left, color filters Ye3, G3, Mg4 and Cy4 are arranged; and on the fourth line L4, which is rotated two columns to the left relative to the third line L3, starting at the left, color filters Mg3, Cy3, Ye4 and G4 are arranged.

As is described above, the color filter 711 is so arranged that the color filters do not overlap on any line and their cyclic patterns of four pixels horizontally and four pixels vertically differ, and that the color filters do not overlap in any column and their cyclic patterns of four pixels horizontally and four pixels vertically differ.

In the filter arrangement in FIG. 4, the color filters may be inverted from side to side or vertically.

The object light passes through the thus arranged color filter 711 and impinges on the light receiving face (not shown) of the pixel unit 712. The pixel unit 712 performs a photoelectric conversion to obtain a pixel signal that corresponds to the volume of light received at each pixel on the light receiving face. In accordance with a signal reading method, which will be described later, the signal reading unit 713 reads a pixel signal obtained at the pixel unit 712 and transmits the pixel signal to the luminance/color difference preparation unit 720. The luminance/color difference preparation unit 720 obtains luminance signal Y, blue color difference signal CB and red color difference signal CR by employing pixel signals for areas having various sizes and shapes that were received from the signal reading unit 713.

An explanation will now be given for the pixel signal reading method used by the signal reading unit 713, and for the calculations performed by the luminance/color difference preparation unit 720 while using the pixel signal that is read using the signal reading method.

[Signal Reading Method 1]

The signal reading unit 713 reads, from the pixel unit 712, a string of pixel signals: (G1+Ye1), (Cy1+Mg1), (Cy2+Mg2), (G2+Ye2), . . . Then, from a pair (added signal) of adjacent pixel signals in the pixel signal string, the luminance/color difference preparation unit 720 acquires color difference signal CB by, for example, performing the following calculations:

$$CB1=(G1+Ye1)-(Cy1+Mg1)$$

$$CB2=-(Cy2+Mg2)+(G2+Ye2).$$

The signal reading unit 713 also reads, from the pixel unit 712, a string of pixel signals: (G1+Cy1), (Ye1+Mg1), (Cy2+G2), (Mg2+Ye2), . . . Then, from a pair of adjacent pixel signals in the pixel signal string, the luminance/color difference preparation unit 720 acquires color difference signal CR by, for example, performing the following calculations:

$$CR1=(G1+Cy1)-(Ye1+Mg1)$$

$$CR2=(Cy2+G2)-(Mg2+Ye2).$$

According to signal reading method 1, unlike the prior art there are no lines for which the calculation can not be performed to obtain color signals CB and CR, and color difference signals CB and CR are each consistently obtained for two pixel signals, both horizontally and vertically. Therefore, a high resolution is acquired horizontally and vertically.

[Signal Reading Method 2]

Signal reading methods 2 to 5 are those whereby luminance signal Y can be output at a high resolution. These methods are appropriate for auto focusing that is performed with calculations that use only luminance signal Y.

According to signal reading method 2, the signal reading unit 713 reads from the pixel unit 712 a string of pixel signals: (G1+Cy1+Ye3+Mg3), (Ye1+Mg1+G3+Cy3), . . . To calculate luminance signal Y, the luminance/color difference preparation unit 720 employs the pixel signal string for the equations:

$$Y1=G1+Cy1+Ye3+Mg3$$

$$Y2=Ye1+Mg1+G3+Cy3.$$

According to signal reading method 2, since one luminance signal Y is obtained horizontally for each pixel, a high horizontal resolution is obtained. The luminance signal Y generated using this method is an optimal auto focusing detection signal, especially when an object is one, such as a fine striped pattern, that has a high horizontal resolution.

[Signal Reading Method 3]

The signal reading unit 713 reads from the pixel unit 712 a string of pixel signals: (G1+Cy1+Ye3+Mg3), (Ye1+Mg1+G3+Cy3), . . . To calculate luminance signal Y, luminance/color difference preparation unit 720 employs the pixel signal string for the equations:

$$Y1=(G1+Cy1+Ye3+Mg3)+(Ye1+Mg1+G3+Cy3).$$

According to signal reading method 3, since one luminance signal Y is obtained horizontally for each two pixels, a level of the luminance signal Y becomes high. The luminance signal Y generated using this method is an optimal auto focusing detection signal, especially when an object is one, such as a fine striped pattern, that has a high horizontal resolution, and when the object is low luminance.

[Signal Reading Method 4]

The signal reading unit 713 reads from the pixel unit 712 a string of pixel signals: (G1+Ye1+Cy2+Mg2), (Cy1+Mg1+G2+Ye2), . . . To calculate luminance signal Y, the luminance/color difference preparation unit 720 employs the pixel signal string for the equations:

$$Y1=G1+Ye1+Cy2+Mg2$$

$$Y2=Cy1+Mg1+G2+Ye2.$$

According to signal reading method 4, since one luminance signal Y is obtained vertically for each pixel, a high vertical resolution is obtained. The luminance signal Y generated using this method is an optimal auto focusing detection signal, especially when an object is one, such as a fine striped pattern, that has a high vertical resolution.

[Signal Reading Method 5]

The signal reading unit 713 reads from the pixel unit 712 a string of pixel signals: (G1+Ye1+Cy2+Mg2), (Cy1+Mg1+G2+Ye2), . . . To calculate luminance signal Y, the luminance/color difference preparation unit 720 employs the pixel signal string for the equation:

$$Y1=(G1+Ye1+Cy2+Mg2)+(Cy1+Mg1+G2+Ye2).$$

According to signal reading method 5, since one luminance signal Y is obtained vertically for every two pixels, the level of luminance signal Y is increased. The luminance signal Y generated using this method is an optimal auto focusing detection signal, especially when an object is one, such as a fine striped pattern, that has a high horizontal resolution and a low luminance level.

[Signal Reading Method 6]

The signal reading unit 713 reads, from the pixel unit 712, a string of pixel signals: (G1+Ye1), (Cy1+Mg1), (Cy2+Mg2), (G2+Ye2), . . . Then, from a pair of adjacent pixel signals in the pixel signal string, the luminance/color difference preparation unit 720 acquires color difference signal CB by, for example, performing the following calculations:

$$CB1=(G1+Ye1)-(Cy1+Mg1)$$

$$CB2=-(Cy2+Mg2)+(G2+Ye2).$$

The signal reading unit 713 also reads, from the pixel unit 712, a string of pixel signals: (Ye3+Mg3), (G3+Cy3), (Mg4+Ye4), (Cy4+G4), Then, from a pair of adjacent pixel signals in the pixel signal string, the luminance/color difference preparation unit 720 acquires color difference signal CR by, for example, performing the following calculations:

$$CR1=-(Ye3+Mg3)+(G3+Cy3)$$

$$CR2=-(Mg4+Ye4)+(Cy4+G4).$$

According to signal reading method 6, color signals can be obtained in accordance with the order of the color lines. This is an optimal method for use when an object is a moving picture. With this method an image signal can be output at a high speed because the number of signals that are read (the number of color signal pixels that are read) is only half that of those that are read for the signal reading method 1.

[Signal Reading Method 7]

The signal reading unit 713 reads, from the pixel unit 712, a string of pixel signals: (G1+Ye1), (Cy1+Mg1), (Cy2+Mg2), (G2+Ye2), . . . Then, from a pair of adjacent pixel signals in the pixel signal string, the luminance/color difference preparation unit 720 acquires color difference signal CB by, for example, performing the following calculations:

$CB1=(G1+Ye1)-(Cy1+Mg1)$ $CB2=-(Cy2+Mg2)+(G2+Ye2)$.

The signal reading unit 713 also reads, from the pixel unit 712, a string of pixel signals: (Cy2+G2), (Mg2+Ye2), (Mg4+Ye4), (Cy4+G4), . . . Then, from a pair of adjacent pixel signals in the pixel signal string, the luminance/color difference preparation unit 720 acquires color difference signal CR by, for example, performing the following calculations:

$CR1=(Cy2+G2)-(Mg2+Ye2)$ $CR2=-(Mg4+Ye4)+(Cy4+G4)$.

Signal reading method 7, as well as signal reading method 6, is an optimal method for use when an object is a moving picture, and when this method is used, an image signal can be output at a high speed.

[Signal Reading Method 8]

Color difference signal CB is acquired in the same manner as is described in signal reading method 7.

The signal reading unit 713 reads, from the pixel unit 712, a string of pixel signals: (G1+Cy1), (Ye1+Mg1), (Ye3+Mg3), (G3+Cy3), . . . Then, from a pair of adjacent pixel signals in the pixel signal string, the luminance/color difference preparation unit 720 acquires color difference signal CR by, for example, performing the following calculations:

$CR1=(G1+Cy1)-(Ye1+Mg1)$ $CR2=-(Ye3+Mg3)+(G3+Cy3)$.

Signal reading method 8, as well as signal reading methods 6 and 7, is an optimal method for use when an object is a moving picture, and when this method is used, an image signal can be output at a high speed.

[Signal Reading Method 9]

Color difference signal CB is acquired in the same manner as is described in signal reading method 7.

The signal reading unit 713 reads, from the pixel unit 712, a string of pixel signals: (G1+Cy1), (Ye1+Mg1), (Cy2+G2), (Mg2+Ye2), . . . Then, from a pair of adjacent pixel signals in the pixel signal string, the luminance/color difference preparation unit 720 acquires color difference signal CR by, for example, performing the following calculations:

$CR1=(G1+Cy1)-(Ye1+Mg1)$ $CR2=(Cy2+G2)-(Mg2+Ye2)$.

Signal reading method 9, as well as signal reading methods 6 to 8, is an optimal method for use when an object is a moving picture, and when this method is used, an image signal can be output at a high speed. Furthermore, a feature of this method is that it can obtain color difference signals CB and CR by using pixel signals in the same area.

[Signal Reading Methods 10 to 13]

The signal reading unit 713 reads, from the pixel unit 712, a string of pixel signals: (G1+Ye1), (Cy1+Mg1), (Ye3+G3), (Mg3+Cy3), . . . Then, from a pair of adjacent pixel signals in the pixel signal string, luminance/color difference preparation unit 720 acquires color difference signal CB by, for example, performing the following calculations:

$CB1=(G1+Ye1)-(Cy1+Mg1)$ $CB2=(Ye3+G3)-(Mg3+Cy3)$.

Color difference signal CR is obtained in the same manner as is described in signal reading methods 6 to 9. Signal reading methods 10 to 13, as well as signal reading methods 6 to 9, are optimal methods for use when an object is a moving picture, and when these methods are used, image signals can be output at high speeds.

[Signal Reading Method 14]

The signal reading unit 713 reads, from the pixel unit 712, a string of pixel signals: (G1+Ye1), (Cy1+Mg1), . . . Then, from a pair of adjacent pixel signals in the pixel signal string, the luminance/color difference preparation unit 720 acquires color difference signal CB by, for example, performing the following calculation:

$CB1=(G1+Ye1)-(Cy1+Mg1)$.

The signal reading unit 713 also reads, from the pixel unit 712, a string of pixel signals: (Mg4+Ye4), (Cy4+G4), . . . Then, from a pair of adjacent pixel signals in the pixel signal string, the luminance/color difference preparation unit 720 acquires color difference signal CR by, for example, performing the following calculation:

$CR1=-(Mg4+Ye4)+(Cy4+G4)$.

Signal reading method 14, as well as signal reading methods 6 to 13, is an optimal method for use when an object is a moving picture, and when this method is used, an image signal can be output at a high speed. In particular, since the number of signals that are read using this method (the necessary number of pixels that are read to generate a color difference signal) is only one quarter that of those that are read by signal reading method 1, an image signal can be output at a higher speed.

[Signal Reading Method 15]

Only the generation of a color difference signal has been explained in the signal reading methods 1 and 6 to 14. A luminance signal can be generated by the following signal reading method 15.

Specifically, the signal reading unit 713 reads, from the pixel unit 712, a string of pixel signals: (G1+Ye1), (Cy1+Mg1), (Cy2+Mg2), (G2+Ye2), (Ye3+G3), (Mg3+Cy3), (Mg4+Cy4), (Ye4+G4), . . . Then, from a pair of adjacent pixel signals in the pixel signal string, the luminance/color difference preparation unit 720 acquires luminance signal Y by, for example, performing the following calculations:

$Y1=(G1+Ye1)+(Cy1+Mg1)$ $Y2=(Cy2+Mg2)+(G2+Ye2)$ $Y3=(Ye3+G3)+(Mg3+Cy3)$ $Y4=(Mg4+Cy4)+(Ye4+G4)$.

According to signal reading method 15, luminance signal Y can be obtained horizontally and vertically for every two pixels.

[Signal Reading Method 16]

Only the generation of a color difference signal has been explained in the signal reading methods 1 and 6 to 14. A luminance signal can also be generated by the following signal reading method 16.

Specifically, the signal reading unit 713 reads, from the pixel unit 712, a string of pixel signals: (G1+Cy1), (Ye1+Mg1), (Cy2+G2), (Mg2+Ye2), (Ye3+Mg3), (G3+Cy3), (Mg4+Ye4), (Cy4+G4), Then, from a pair of adjacent pixel signals in the pixel signal string, the luminance/color difference preparation unit 720 acquires luminance signal Y by, for example, performing the following calculations:

$$Y1=(G1+Cy1)+(Ye1+Mg1)$$

$$Y2=(Cy2+G2)+(Mg2+Ye2)$$

$$Y3=(Ye3+Mg3)+(G3+Cy3)$$

$$Y4=(Mg4+Ye4)+(Cy4+G4).$$

According to signal reading method 16, luminance signal Y can be obtained horizontally and vertically for every two pixels.

In the above embodiment, the filter arrangement shown in FIG. 4 is employed for the color filter 711 used in the pixel unit 12. However, the above described signal reading methods 1 to 16 can be applied to a filter arrangement shown in FIG. 5 where the third line L3 and the fourth line L4 in the filter arrangement in FIG. 4 are exchanged.

According to the signal reading methods 1 to 16, signals are read for the 4×4 or the 2×2 pixel block unit, but the unit is not thus limited. Further, a pixel block to be read is not always closely adjacent to a pixel block that was previously read. These pixel blocks may be located at intervals defined by a predetermined block unit. With this arrangement, the number of pixels for signals to be read (the number of pixel signals read for color signals) can be reduced and the processing speed can be increased.

For example, to output at a high speed signals having a low resolution, in an 8×8 pixel block that includes C1, C2, . . . and C8 horizontally and L1, L2, . . . and L8 vertically, color signal CR1 may be obtained from (C1, L1), (C1, L2), (C2, L1), (C2, L2); color signal CB1 may be obtained from (C3, L3), (C3, L4), (C4, L3), (C4, L4); color difference signal CR2 may be obtained from (C5, L5), (C5, L6), (C6, L5), (C6, L6); and color signal CB2 may be obtained from (C7, L7), (C7, L8), (C8, L7), (C8, L8).

Second Embodiment

In a second embodiment, for the image pickup apparatus 700 shown in FIG. 3, suppose that the arrangement of the color filter 711 shown in FIG. 6 is employed.

As is shown in FIG. 6, the color filter 711 is so arranged that it has a cyclic pattern of four pixels horizontally and four pixels vertically. In the thus arranged color filter 711, on the first line L1, starting at the left, color filters G1, Ye1, Mg2 and Cy2 are arranged; on the second line L2, which is rotated two columns to the left relative to the first line L1, starting at the left, color filters Mg1, Cy1, G2 and Ye2 are arranged; on the third line L3, which is rotated one column to the left relative to the first line L1, starting at the left, color filters Cy3, G3, Ye4 and Mg4 are arranged; and on the fourth line L4, which is rotated three columns to the left relative to the first line L1, starting at the left, color filters Ye3, Mg3, Cy4 and G4 are arranged.

As is described above, in the cyclic pattern of four pixels horizontally and four pixels vertically in the color filter 711, on all the lines and in all the columns, all of which differ from each other.

In the arrangement in FIG. 6, the color filters may be inverted from side to side or vertically.

As well as in the first embodiment, object light, which is transmitted through the color filter 711 that has the above described array arrangement, impinges on the light receiving face of the pixel unit 712, which performs a photo-electric conversion of the light to obtain a pixel signal that corresponds to the volume of light received at each pixel on the light receiving face. Using a reading method which will be described later, the signal reading unit 713 reads the pixel signal obtained by the pixel unit 712 and then transmits it to the luminance/color difference preparation unit 720. The luminance/color difference preparation unit 720 obtains luminance signal Y, blue color difference signal CB and red color difference signal CR using pixel signals for various shaped areas that are received from the signal reading unit 713.

An explanation will now be given for the method used by the signal reading unit 713 in this embodiment to read a pixel signal, and the calculations performed by the luminance/color difference preparation unit 720 using a pixel signal that is read in accordance with the reading method.

Since the operation performed by the image pickup apparatus 700 in this embodiment is the same as that in the first embodiment, no explanation will be given, and only the structure differences will be specifically described.

[Signal Reading Method 21]

The signal reading unit 713 reads from the pixel unit 712 a string of pixel signals: (G1+Mg1+Cy3+Ye3), (Ye1+Cy1+G3+Mg3), . . . To calculate luminance signal Y, luminance/color difference preparation unit 720 employs the pixel signal string for the equations:

$$Y1=G1+Mg1+Cy3+Ye3$$

$$Y2=Ye1+Cy1+G3+Mg3$$

According to signal reading method 21, since one luminance signal Y is obtained horizontally for each pixel, a high horizontal resolution is obtained. The luminance signal Y generated using this method is an optimal auto focusing detection signal, especially when an object is one, such as a fine striped pattern, that has a high horizontal resolution.

[Signal Reading Method 22]

The signal reading unit 713 reads from the pixel unit 712 a string of pixel signals: (G1+Mg1+Cy3+Ye3), (Ye1+Cy1+G3+Mg3), . . . To calculate luminance signal Y, luminance/color difference preparation unit 720 employs the pixel signal string for the equations:

$$Y1 = (G1 + Mg1 + Cy3 + Ye3) + (Ye1 + Cy1 + G3 + Mg3).$$

According to signal reading method 22, since one luminance signal Y is obtained horizontally for each two pixels, a level of the luminance signal Y becomes high. The luminance signal Y generated using this method is an optimal auto focusing detection signal, especially when an object is one, such as a fine striped pattern, that has a high horizontal resolution and when the object is low luminance.

[Signal Reading Method 23]

The signal reading unit 713 reads from the pixel unit 712 a string of pixel signals: (G1+Ye1+Mg2+Cy2), (Mg1+Cy1+G2+Ye2), . . . To calculate luminance signal Y, the luminance/color difference preparation unit 720 employs the pixel signal string for the equations:

Y1=G1+Ye1+Mg2+Cy2

Y2=Mg1+Cy1+G2+Ye2.

According to signal reading method 23, since one luminance signal Y is obtained vertically for each pixel, a high vertical resolution is obtained. The luminance signal Y generated using this method is an optimal auto focusing detection signal, especially when an object is one, such as a fine striped pattern, that has a high vertical resolution.

[Signal Reading Method 24]

The signal reading unit 713 reads from the pixel unit 712 a string of pixel signals: (G1+Ye1+Mg2+Cy2), (Mg1+Cy1+G2+Ye2), . . . To calculate luminance signal Y, the luminance/color difference preparation unit 720 employs the pixel signal string for the equation:

$$Y1 = (G1 + Ye1 + Mg2 + Cy2) + (Mg1 + Cy1 + G2 + Ye2).$$

According to signal reading method 24, since one luminance signal Y is obtained vertically for every two pixels, the level of luminance signal Y is increased. The luminance signal Y generated using this method is an optimal auto focusing detection signal, especially when an object is one, such as a fine striped pattern, that has a high vertical resolution and a low luminance level.

[Signal Reading Method 25]

The signal reading unit 713 reads, from the pixel unit 712, a string of pixel signals: (G1+Ye1), (Mg1+Cy1), (Mg2+Cy2), (G2+Ye2), . . . Then, from a pair of adjacent pixel signals in the pixel signal string, the luminance/color difference preparation unit 720 acquires color difference signal CB by, for example, performing the following calculations:

CB1=(G1+Ye1)−(Mg1+Cy1)

CB2=−(Mg2+Cy2)+(G2+Ye2).

The signal reading unit 713 also reads, from the pixel unit 712, a string of pixel signals: (Cy3+G3), (Ye3+Mg3), (Ye4+Mg4), (Cy4+G4), . . . Then, from a pair of adjacent pixel signals in the pixel signal string, the luminance/color difference preparation unit 720 acquires color difference signal CR by, for example, performing the following calculations:

CR1=(Cy3+G3)−(Ye3+Mg3)

CR2=−(Ye4+Mg4)+(Cy4+G4).

According to signal reading method 25, color difference signals can be obtained in accordance with the order of the color lines. This is an optimal method for use when an object is a moving picture. With this method an image signal can be output at a high speed because the number of signals that are read (the number of color signal pixels that are read) is only half that of those that are read for all the pixels.

[Signal Reading Method 26]

The signal reading unit 713 reads, from the pixel unit 712, a string of pixel signals: (G1+Ye1), (Mg1 +Cy1), . . . Then, from a pair of adjacent pixel signals in the pixel signal string, the luminance/color difference preparation unit 720 acquires color difference signal CB by, for example, performing the following calculations:

CB1=(G1+Ye1)−(Mg1+Cy1).

The signal reading unit 713 also reads, from the pixel unit 712, a string of pixel signals: (Ye4+Mg4), (Cy4+G4), . . . Then, from a pair of adjacent pixel signals in the pixel signal string, the luminance/color difference preparation unit 720 acquires color signal CR by, for example, performing the following calculations:

CR1=(Ye4+Mg4)−(Cy4+G4).

Signal reading method 26, as well as signal reading method 25, is an optimal method for use when an object is a moving picture, and when this method is used, an image signal can be output at a high speed. Further, an image signal can be output at a high speed because the number of signals that are read is only half that of those that are read for all the pixels.

[Signal Reading Method 27]

Only the generation of a color signal has been explained in the signal reading methods 25 and 26. A luminance signal can be generated by the following signal reading method 27.

Specifically, the signal reading unit 713 reads, from the pixel unit 712, a string of pixel signals: (G1+Ye1), (Mg1+Cy1), (Mg2+Cy2), (G2+Ye2), (Cy3+G3), (Ye3+Mg3), (Ye4+Mg4), (Cy4+G4), . . . Then, from a pair of adjacent pixel signals in the pixel signal string, the luminance/color difference preparation unit 720 acquires luminance signal Y by, for example, performing the following calculations:

Y1=(G1+Ye1)+(Mg1+Cy1)

Y2=(Mg2+Cy2)+(G2+Ye2)

Y3=(Cy3+G3)+(Ye3+Mg3)

Y4=(Ye4+Mg4)+(Cy4+G4).

According to signal reading method 27, luminance signal Y can be obtained horizontally and vertically for every two pixels.

[Signal Reading Method 28]

Only the generation of a color signal has been explained in the signal reading methods 25 and 26. A luminance signal can also be generated by the following signal reading method 28.

Specifically, the signal reading unit 713 reads, from the pixel unit 712, a string of pixel signals: (G1+Mg1), (Ye1+Cy1), (Mg2+G2), (Cy2+Ye2), (Cy3+Ye3), (G3+Mg3), (Ye4+Cy4), (Mg4+G4), . . . Then, from a pair of adjacent pixel signals in the pixel signal string, the luminance/color difference preparation unit 720 acquires luminance signal Y by, for example, performing the following calculations:

Y1=(G1+Mg1)+(Ye1+Cy1)

Y2=(Mg2+G2)+(Cy2+Ye2)

Y3=(Cy3+Ye3)+(G3+Mg3)

Y4=(Ye4+Cy4)+(Mg4+G4).

According to signal reading method 28, luminance signal Y can be obtained horizontally and vertically for every two pixels.

In the above embodiment, the filter arrangement shown in FIG. 6 is employed for the color filter 711 used in the pixel unit 12. However, the above described signal reading methods 21 to 28 can be applied to a filter arrangement shown in FIG. 7 where the third line L3 and the fourth line L4 in the filter arrangement in FIG. 6 are exchanged.

According to the signal reading methods 21 to 26, signals are read for the 4×4 pixel block unit, but the unit is not thus limited. Further, a pixel block to be read is not always closely adjacent to a pixel block that was previously read. These pixel blocks may be located at intervals defined by a predetermined block unit. With this arrangement, the number of pixels for signals to be read (the number of pixel signals read for color signals) can be reduced and the processing speed can be increased.

Third Embodiment

In a third embodiment, a CMOS sensor, for example, is employed as the image pickup apparatus in FIG. 2. In this case, the following circuit structure can be employed to perform signal reading methods 1 to 28 in the first and the second embodiments.

Figure 8:
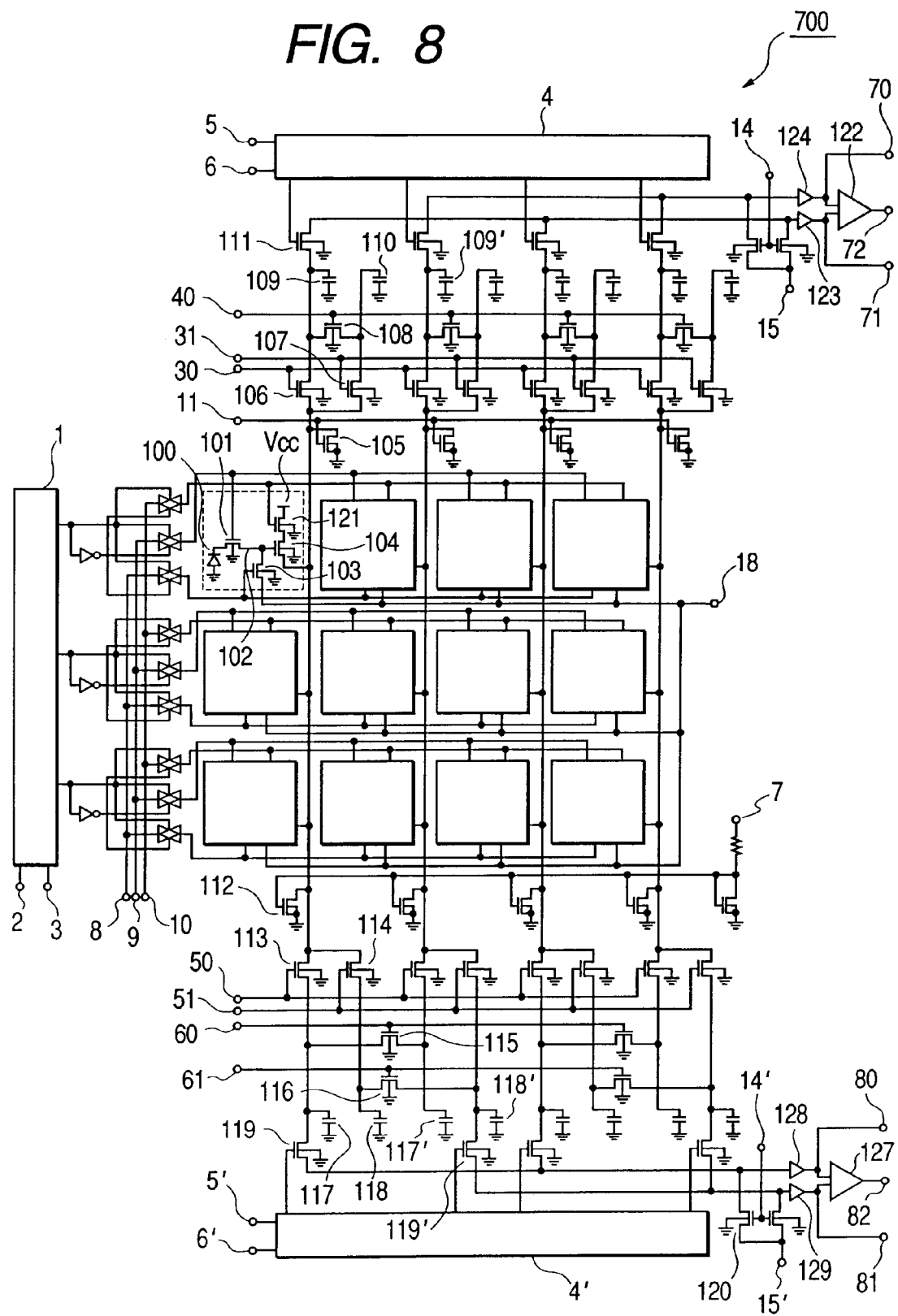
FIG. 8 is a diagram for explaining the circuit structure, according to a third embodiment of the present invention, of an image pickup apparatus that performs pixel signal reading method 1 of the first and the second embodiments.

In FIG. 8 is shown the circuit structure of the image pickup apparatus 700 (hereinafter referred to as "the CMOS sensor 700").

The CMOS sensor 700 comprises: a first output system for outputting a difference between an average value for light quantities received (detected light quantities) at two pixels (photo detectors) that are adjacent vertically and an average value for the light quantities detected by two photo detectors in the next column that are adjacent horizontally; and a second output system for outputting a difference between an average value for light quantities detected by two photo detectors that are adjacent horizontally and an average value for light quantities detected by two photo detectors on the next line that are adjacent horizontally. With this arrangement, the CMOS sensor 700 can perform reading method 1.

Specifically, in FIG. 8, first, a vertical scanning circuit 1 generates enable signals that are rendered active in order to vertically enable control signals for the individual lines, and then photodiodes 100, which are light detectors for converting incident light into charges, generate charges that are transmitted by transmission transistors 101 to floating diffusion areas 102, wherein the charges generated by the photo detectors 100 are temporarily stored.

Reset transistors 103, which discharge charges accumulated at the gates of amplifier transistors 104, are provided as are switch transistors 121 and constant current transistors 112. The constant current is determined by a voltage applied at a terminal 7.

Transistors 105 discharge the charges on capacitors 109, 110, 117 and 118; distribution transistors 106 connect the sources of the amplifier transistors 104 and the capacitors 109; and distribution transistors 107 connect the sources of the amplifier transistors 104 and the capacitors 110.

The capacitors 109 and 110 function as line memories that are charged by a voltage supplied by the amplifier transistors 104.

Averaging transistors 108 control the averaging of the charges accumulated on the capacitors 109 and the charges accumulated on the capacitors 110; and switch transistors 111 transmit voltages on the capacitors 109, which serve as line memories, to a buffer 123 provided at the preceding stage of a differential amplifier 122.

The differential amplifier 122 amplifies a difference between the voltage of the capacitor 109 and the voltage of the capacitor 109'.

Switch transistors 113 connect the sources of the amplifier transistors 104 and the capacitors 117, and switch transistors 114 connect the sources of the amplifier transistors 104 and the capacitors 118.

The capacitors 117 and 118 serve as line memories that are charged by a current supplied by the sources for the amplifier transistors 104, and switch transistors 115 control the averaging of the charges accumulated on the capacitors 117 and the charges accumulated on the capacitors 117'.

Switch transistors 116 control the averaging of the charges accumulated on the capacitors 118 and the charges accumulated on the capacitors 118'. Switch transistors 119 transmit the voltages on the capacitors 117, which are line memories, to a buffer 128 at the preceding stage of a differential amplifier 127.

The differential amplifier 127 amplifies a difference between the voltage on the capacitor 117 and the voltage on the capacitor 118'.

The above described constant-current transistors 112 are activated for each line, and are paired with the amplifier transistors 104 to form amplifiers.

Figure 9:
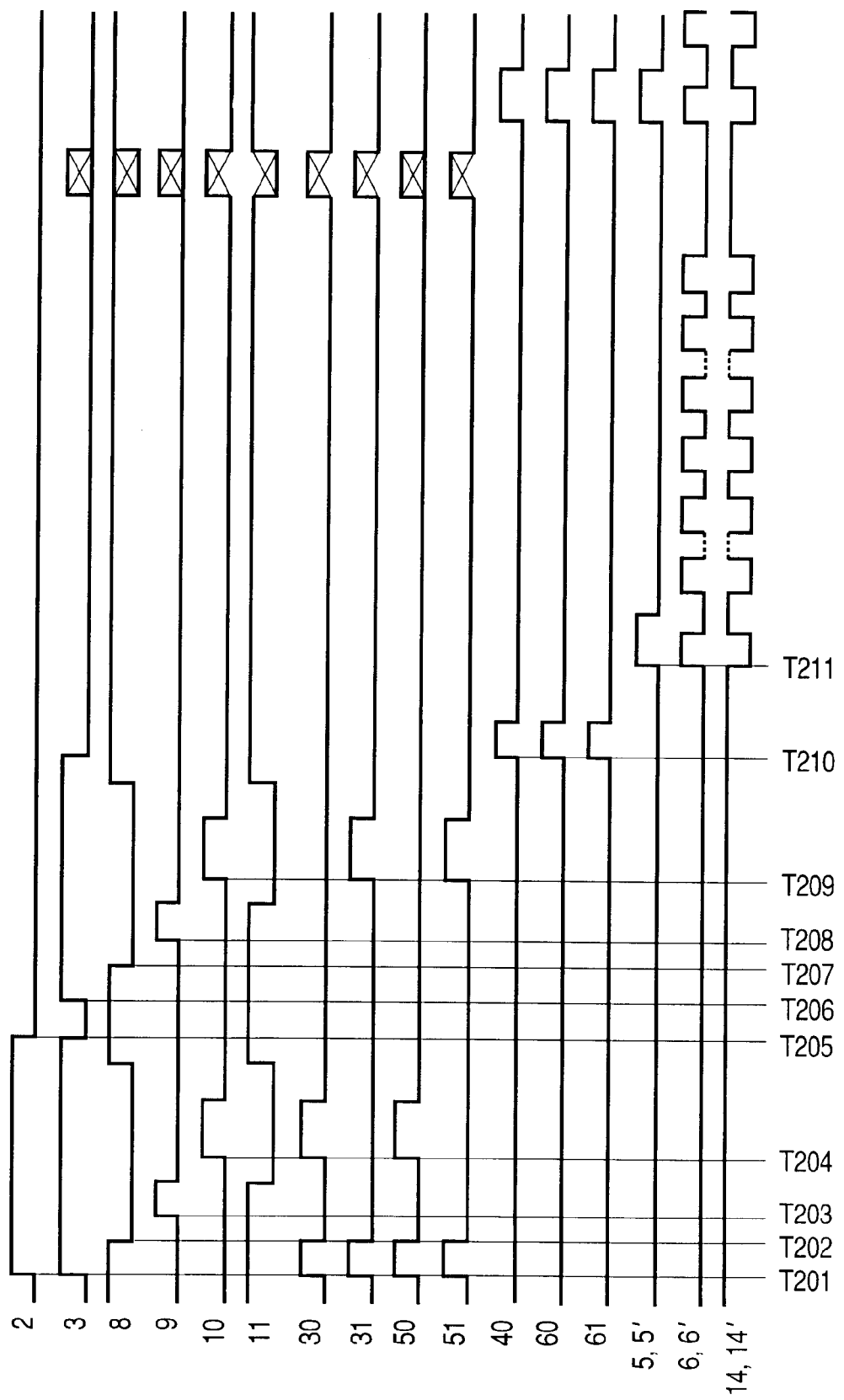
FIG. 9 is a diagram for explaining the processing performed by the image pickup apparatus having the above circuit structure.

FIG. 9 is a timing chart showing the operating timings for the CMOS sensor 700 in FIG. 8. The processing performed by the CMOS sensor 700 will now be described while referring to FIGS. 8 and 9.

First, at time T201 the level of a pulse input at a terminal 11 is HIGH. In this situation, when pulses input to terminals 30, 31, 50 and 51 go HIGH, the capacitors 109, 110, 117 and 118, which serve as line memories, are reset to the initial potential. Further, when a start pulse for the vertical scanning circuit 1 input at a terminal 2 and a scan pulse input at a terminal 3 go HIGH, the vertical scanning circuit 1 begins scanning and selects the first line (R1). Since the HIGH pulse is input at a terminal 8, the floating diffusion area in the pixel unit is reset.

At time T202 the reset pulse input at the terminal 8 goes LOW (is dropped). Thus, the floating diffusion areas of pixels on the first line are set to the electrically floating state.

Next, when at time T203 the pulse input at the terminal 9 goes HIGH, the charges are transmitted from the photo detectors on the first line to the floating diffusion areas.

When at time T204 pulses input at the terminals 10, 30 and 50 go HIGH, a voltage that is proportional to the quantity of the light detected by the photo detector on the first line is read by the amplifier transistor 104 for the capacitors 109 and 117.

Then, at time T205 the vertical scan pulse input to the terminal 3 goes LOW (is dropped).

When at time T206 the vertical pulse input at the terminal 3 goes HIGH again (rises), the second line (R2) is selected.

When at time T207 the reset pulse input at the terminal 8 goes LOW (is dropped), the floating diffusion areas of pixels on the second line are set to the electrically floating state.

When at time T208, as well as at time T203, the pulse input at the terminal 9 goes HIGH, charges are transmitted from the photo detectors on the second line to the floating diffusion areas.

Also at time T209, as well as time T204, the pulses input at the terminals 10, 31 and 51 go HIGH, and a voltage that is proportional to the quantity of the light detected by each photo detector on the second line is read by the amplifier transistor 104 for the capacitors 110 and 118 for the second line.

When at time T210 the pulses input at the terminals 40, 60 and 61 go HIGH, the charges accumulated on the capacitors 117, which serve as line memories, are averaged.

At time T211 a horizontal scanning circuit 4 is activated, and horizontally transmits the averaged voltage to the differential amplifiers 122 and 127, in order.

Then, the differential amplifiers 122 and 127 output blue color signal CB and red color signal CR.

In addition, luminance signal Y is also obtained when the output at terminal 70, 71, 80 or 81 is added to an adder (not shown) that is constituted by an operational amplifier. Furthermore, when the charges detected by the photo detectors for all the lines are temporarily stored in the capacitors 109 without being averaged by the averaging transistor 108, the output for each pixel on every odd line can be obtained from the terminal 71. At the same time, the output for each pixel on every even line can be obtained from the terminal 70.

Fourth Embodiment

In the third embodiment, the circuit structure shown in FIG. 8 is employed for the CMOS sensor 700. In a fourth embodiment, the structure shown in FIG. 10, for example, is employed.

The same reference numerals as are used in FIG. 8 are also used to denote corresponding or identical components of the circuit structure in FIG. 10 and no detailed explanation for them will be given.

The CMOS sensor 700 includes an output system for outputting the average of the light quantities detected by two photo detectors that are adjacent horizontally, or the average of the light quantities detected by four photo detectors that are adjacent horizontally. With this circuit arrangement, the CMOS sensor 700 can perform signal reading methods 4 and 23.

Figure 10:
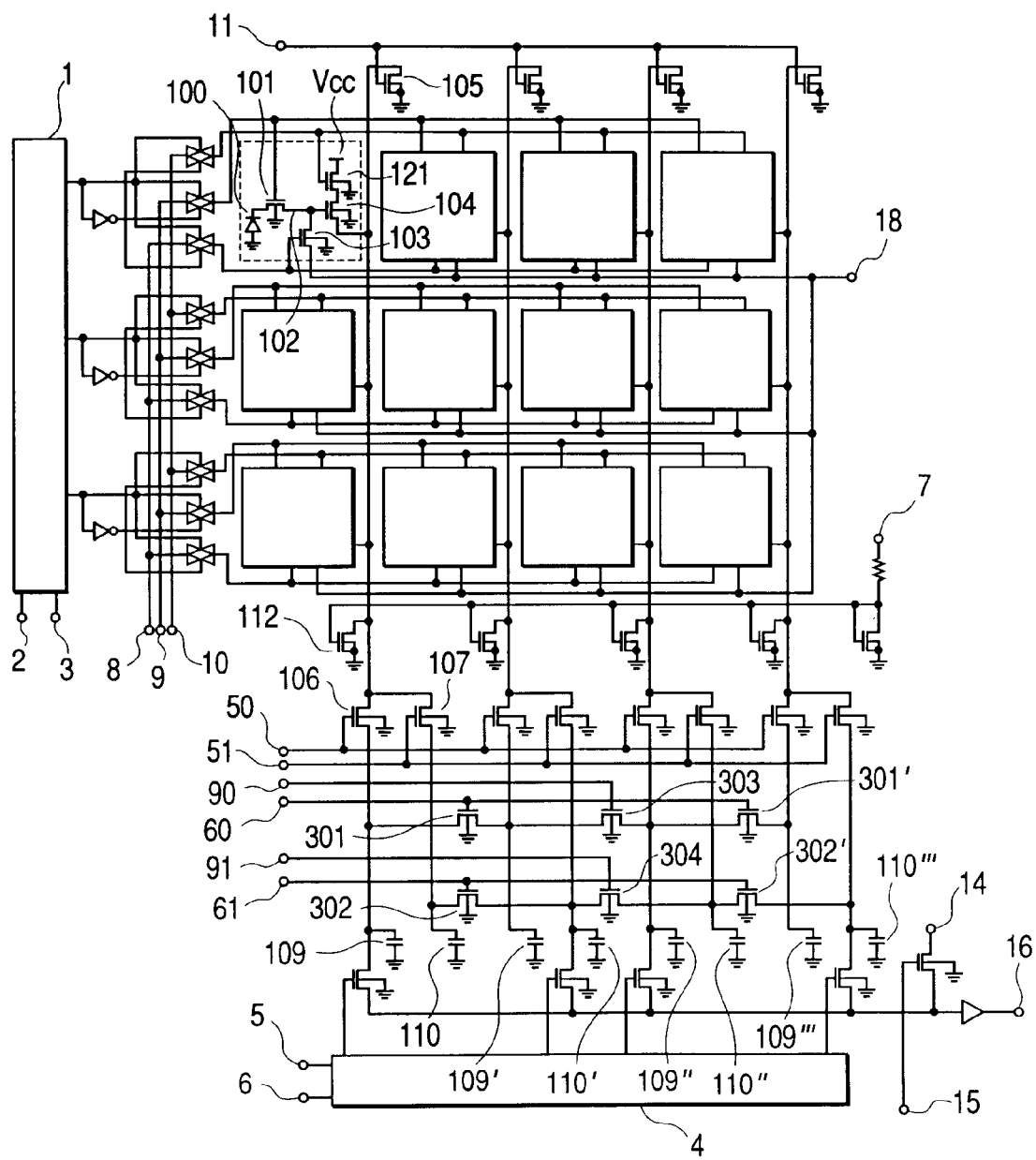
FIG. 10 is a diagram for explaining the circuit structure, according to a fourth embodiment of the present invention, of an image pickup apparatus that performs pixel signal reading method 1 of the first and the second embodiments.

Specifically, in FIG. 10, a switch transistor 301 controls the averaging of the charges accumulated on a capacitor 109 and the charges accumulated on a capacitor 109'. A switch transistor 302 controls the averaging of the charges accumulated on a capacitor 110 and the charges accumulated on a capacitor 110'.

A switch transistor 301' controls the averaging of the charges accumulated on a capacitor 109" and the charges accumulated on a capacitor 109'". A switch transistor 302' controls the averaging of the charges accumulated on a capacitor 110" and the charges accumulated on a capacitor 110'".

A switch transistor 303 controls the averaging of the charges accumulated on the capacitor 109' and the charges accumulated on the capacitor 109". A switch transistor 304 controls the averaging of the charges accumulated on the capacitor 110' and the charges accumulated on the capacitor 110".

When the switch transistors 301, 301' and 303 interact with each other, they average the charges accumulated on the capacitors 109, 109', 109" and 109'". That is, when the switch transistor 303 is turned on, for example, after or at the same time as the switch transistors 301 and 301' are turned on, these transistors average the charges accumulated on the capacitors 109, 109', 109" and 109'".

When the switch transistors 302, 302' and 304 interact with each other, they average the charges accumulated on the capacitors 110, 110', 110" and 110'". That is, when the switch transistor 304 is turned on after or at the same time the switch transistors 302 and 304' are turned on, these transistors average the charges accumulated on the capacitors 110, 110', 110" and 110'".

Figure 11:
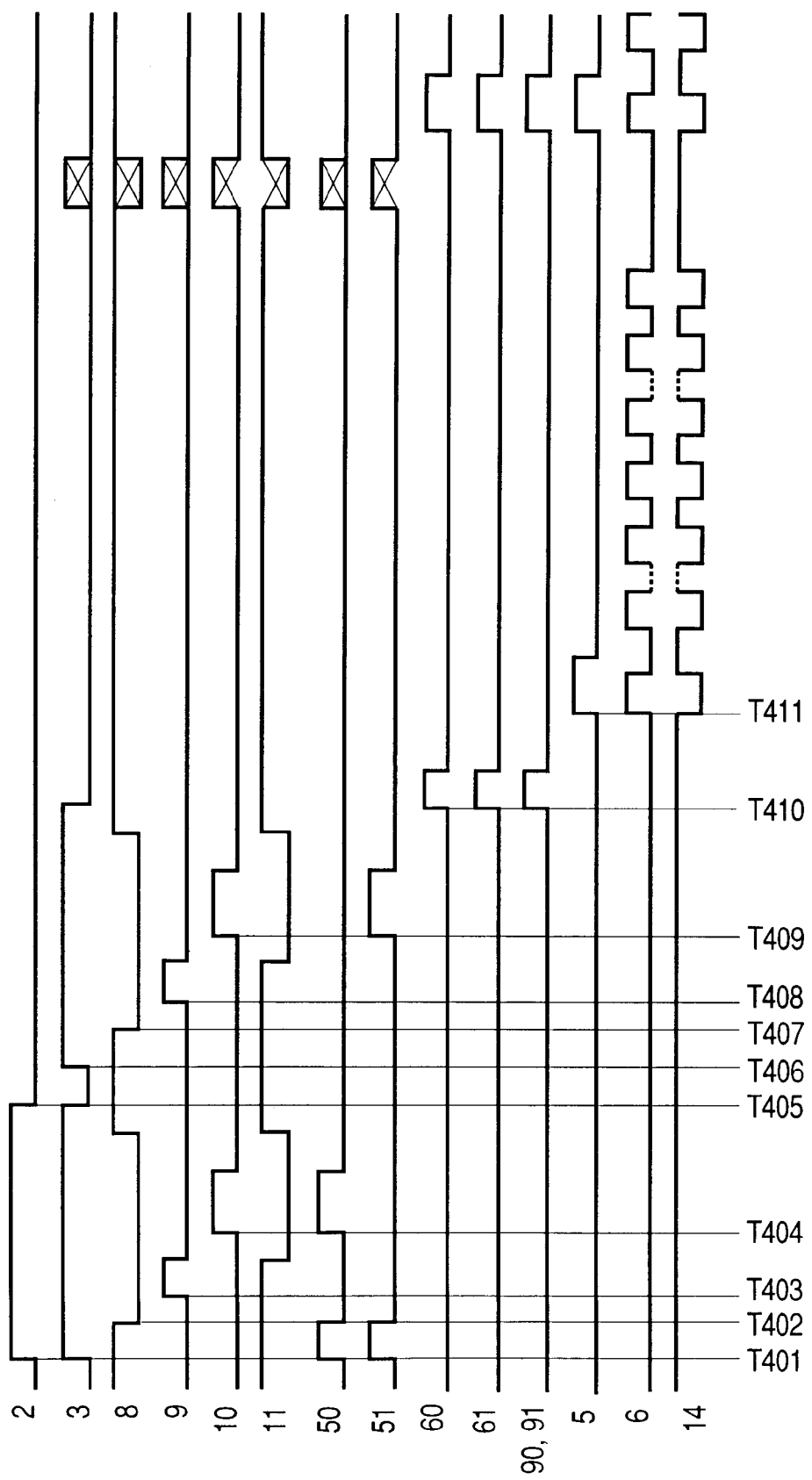
FIG. 11 is a diagram for explaining the processing performed by the image pickup apparatus having the above circuit structure.

FIG. 11 is a timing chart showing the operating timings for the CMOS sensor 700 in FIG. 10. The processing performed by the CMOS sensor 700 will now be described while referring to FIGS. 10 and 11.

First, when at time T401 a start pulse for the vertical scanning circuit 1 input at a terminal 2 and a vertical scan pulse input at a terminal 3 go HIGH, the vertical scanning circuit 1 begins scanning and selects the first line (R1). Since the reset pulse input at a terminal 8 is HIGH, the floating diffusion area in the pixel unit is reset.

At time T402 the reset pulse input at the terminal 8 goes LOW (is dropped). Thus, the floating diffusion areas of pixels on the first line are set to the electrically floating state.

Next, when at time T403 the pulse input at the terminal 8 goes HIGH, the charges are transmitted from the photo detectors on the first line to the floating diffusion areas.

When at time T404 pulses input at the terminals 10 and 50 go HIGH, a voltage that is proportional to the light quantity detected by the photo detector on the first line is read for the capacitor 109 by the amplifier transistor 104.

Then, at time T405 the vertical scan pulse input to the terminal 3 goes LOW (is dropped).

When at time T406 the vertical pulse input at the terminal 3 goes HIGH again (rises), the second line (R2) is selected.

When at time T407 the reset pulse input at the terminal 8 goes LOW (is dropped), the floating diffusion areas of pixels on the second line are set to the electrically floating state.

When at time T408, as well as at time T403, the pulse input at the terminal 9 goes HIGH, charges are transmitted from the photo detectors on the second line to the floating diffusion areas.

Also at time T409, as well as time T404, the pulses input at the terminals 10 and 51 go HIGH, and a voltage that is proportional to the light quantity detected by each photo detector on the second line is read for the capacitor 110 by the amplifier transistor 104 for the second line.

When at time T410 the pulses input at terminals 60, 61, 90 and 91 go HIGH, the charges accumulated on the capacitors 109, 109', 109" and 109'", and the charges accumulated on the capacitors 110, 110', 110" and 110'" are averaged in the line memories.

At time T411 a horizontal scanning circuit 4 is activated that horizontally transmits the averaged voltage.

Since the purpose is the output of luminance signal Y, in the circuit arrangement in FIG. 10 provided for the terminal 16 is only one output terminal of the CMOS sensor 700 system. However, as well as the structure shown in FIG. 8, a plurality of terminals (output lines) may be provided for the CMOS sensor 700 to obtain color difference signals CB and CR.

Fifth Embodiment

In the third embodiment, the circuit structure shown in FIG. 8 is employed for the CMOS sensor 700. In the fifth embodiment, the arrangement shown in FIG. 12 is employed.

The same reference numerals as are used in FIG. 8 are also used to denote corresponding or identical components in the structure in FIG. 12, and no detailed explanation for them will be given.

The CMOS sensor 700 includes an output system for outputting the average of the light quantities detected by two photo detectors that are adjacent vertically, or the average of light quantities detected by four photo detectors that are adjacent vertically. With this circuit arrangement, the CMOS sensor 700 can perform signal reading methods 2 and 21.

Figure 12:
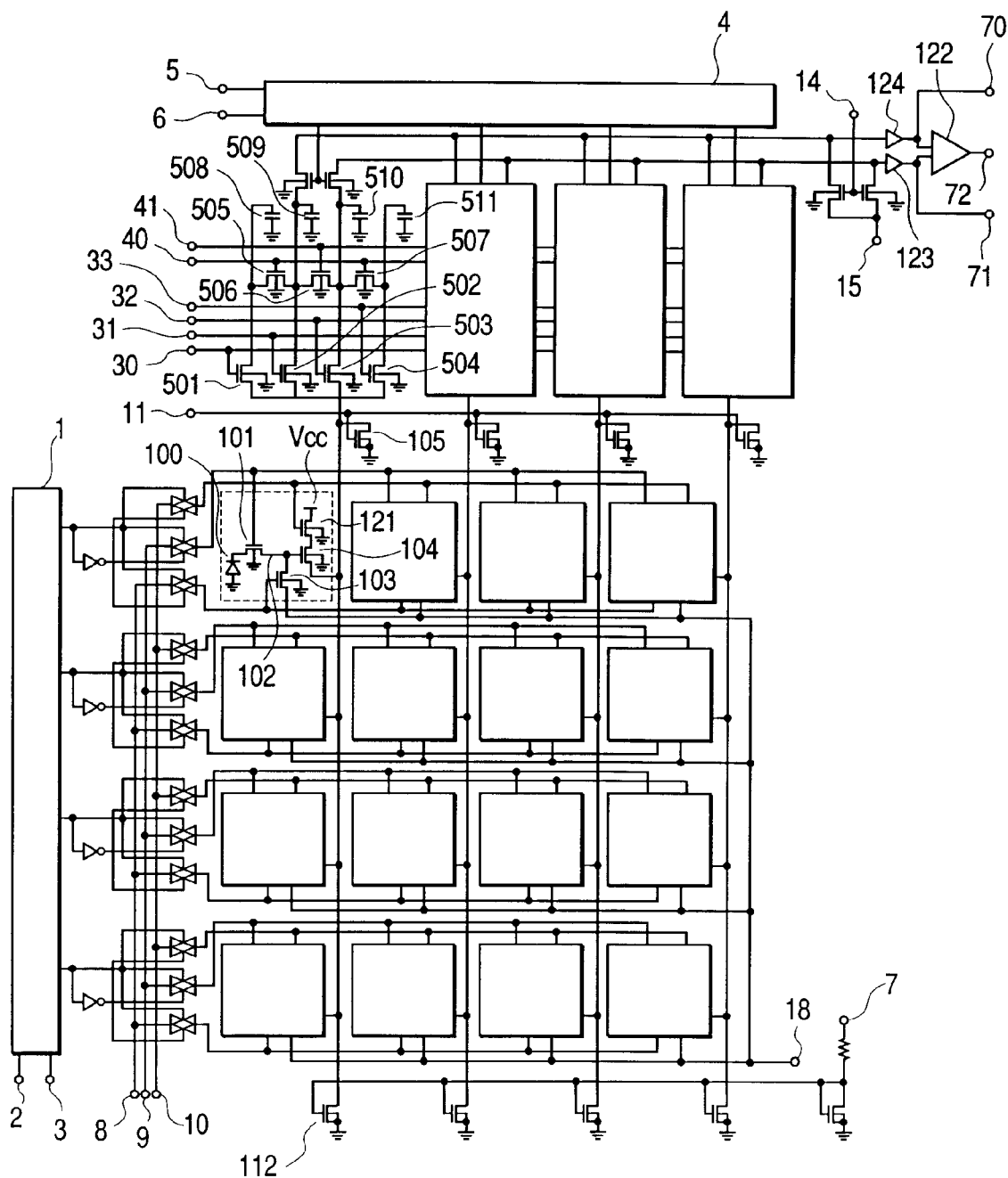
FIG. 12 is a diagram for explaining the circuit structure, according to a fifth embodiment of the present invention, of an image pickup apparatus that performs pixel signal reading method 1 of the first and the second embodiments.

Specifically, in FIG. 12, distribution transistors 501, 502, 503 and 504 transmit to corresponding capacitors 508, 509, 510 and 511 a current that is received from a transistor 104.

The capacitor 508 accumulates charges at photodetectors on the first line (R1); the capacitor 509 accumulates charges at photodetectors on the second line (R2); the capacitor 510 accumulates charges at photodetectors on the third line (R3); and the capacitor 511 accumulates charges at photodetectors on the fourth line (R4).

A switch transistor 505 controls the averaging of the charges accumulated on the capacitor 508 and the charges accumulated on the capacitor 509; a switch transistor 506 controls the averaging of the charges accumulated on the capacitor 509 and the charges accumulated on the capacitor 510; and a switch transistor 507 controls the averaging of the charges accumulated on the capacitor 510 and the charges accumulated on the capacitor 511.

When the switch transistors 505, 506 and 507 interact with each other, they average the charges accumulated on the capacitors 508, 509, 510 and 511. That is, when the switch transistor 506 is turned on after or at the same time as the switch transistors 505 and 507 are turned on, these transistors average the charges accumulated on the capacitors 508, 509, 510 and 511.

Figure 13:
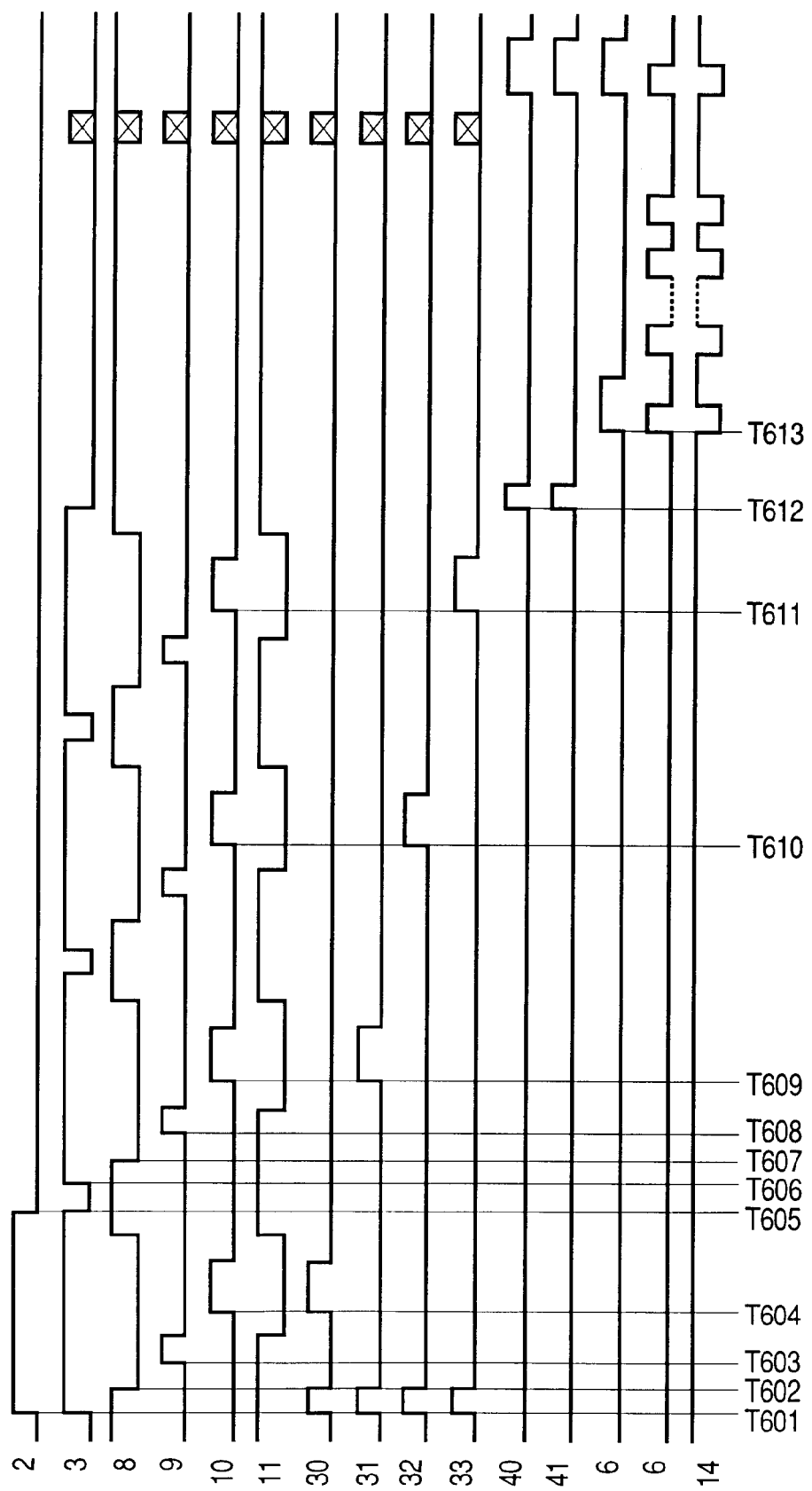
FIG. 13 is diagram for explaining the processing performed by the image pickup apparatus having the above circuit structure.

FIG. 13 is a timing chart showing the operating timings for the CMOS sensor 700 in FIG. 12. The processing performed by the CMOS sensor 700 will now be described while referring to FIGS. 12 and 13.

First, when at time T601 a start pulse for the vertical scanning circuit 1 input at a terminal 2 and a vertical scan pulse input at a terminal 3 go HIGH, the vertical scanning circuit 1 begins scanning and selects the first line (R1). Since the reset pulse input at a terminal 8 is HIGH, the floating diffusion area in the pixel unit is reset.

At time T602 the reset pulse input at the terminal 8 goes LOW (is dropped). Thus, the floating diffusion areas of pixels on the first line are set to the electrically floating state.

Next, when at time T603 the pulse input at the terminal 8 goes HIGH, the charges are transmitted from the photo detectors on the first line to the floating diffusion areas.

When at time T604 pulses input at the terminals 10 and 30 go HIGH, charges that are proportional to the light quantities detected by the photodetectors on the first line are accumulated on the capacitors 508.

Then, at time T605 the vertical scan pulse input to the terminal 3 goes LOW (is dropped).

When at time T606 the vertical pulse input at the terminal 3 goes HIGH again (rises), the second line (R2) is selected.

When at time T607 the reset pulse input at the terminal 8 goes LOW (is dropped), the floating diffusion areas of pixels on the second line are set to the electrically floating state.

When at time T608, as well as at time T603, the pulse input at the terminal 9 goes HIGH, charges are transmitted from the photo detectors on the second line to the floating diffusion areas.

Also at time T609, as well as at time T604, the pulses input at the terminals 10 and 31 go HIGH, and charges that are proportional to the light quantities detected by photodetectors on the second line are accumulated on the capacitors 509.

Similarly, at time T610 the pulses input at the terminals 10 and 32 go HIGH, and charges that are proportional to the light quantities detected by photodetectors on the third line are accumulated on the capacitors 510.

Further, at time T611 the pulses input at the terminals 10 and 33 go HIGH, and charges that are proportional to the light quantities detected by photodetectors on the fourth line are accumulated on the capacitors 511.

When at time T612 the pulses input at the terminals 40 and 41 go HIGH, the charges accumulated on the capacitors 508, 509, 510 and 511 are averaged in the line memory.

At time T613 the horizontal scanning circuit 4 is activated to horizontally output, in order, the averaged voltage. Therefore, a voltage that is proportional to the average of the light quantities detected by the photodetectors on the first to the fourth lines (R1, R2, R3 and R4) is output in the direction of the columns.

Since the switch transistor 506 is not used to average the charges in the circuit structure shown in FIG. 12, the average value for the first column (C1) and the second column (C2) can be obtained from the output terminal 70, the average value for the third column (C3) and the fourth column (C4) can be obtained from the output terminal 71, and a difference between the average value for the first column (C1) and the second column (C2) and the average value for the third column (C3) and the fourth column (C4) can be obtained from the output terminal 72.

Furthermore, in the processing performed by the CMOS sensor 700 that was explained while referring to FIGS. 8 to 13, a reset voltage for a floating diffusion area may be read to another line memory before a charge (a light signal) at a pixel is read. A variance in an output voltage, which is caused by a variance in the threshold voltages of the transistors 104, can be removed by obtaining a difference between the reset voltage and the light signal. Therefore, since a noise due to such a variance is not included in signals that correspond to light quantities detected by the photodetectors, signals having a high S/N ratio can be obtained.

The vertical and horizontal scanning may be performed for each block, or intermittently for every multiple block. As a result, a more compressed signal can be obtained.

Sixth Embodiment

In the above described embodiments, to read signals for each pixel block, a pixel block to be read must be closely adjacent to a preceding pixel block that has been read. In this embodiment, a pixel block to be read is shifted, for example, one pixel away from a preceding pixel block that has been read (overlapping reading).

Figure 14:
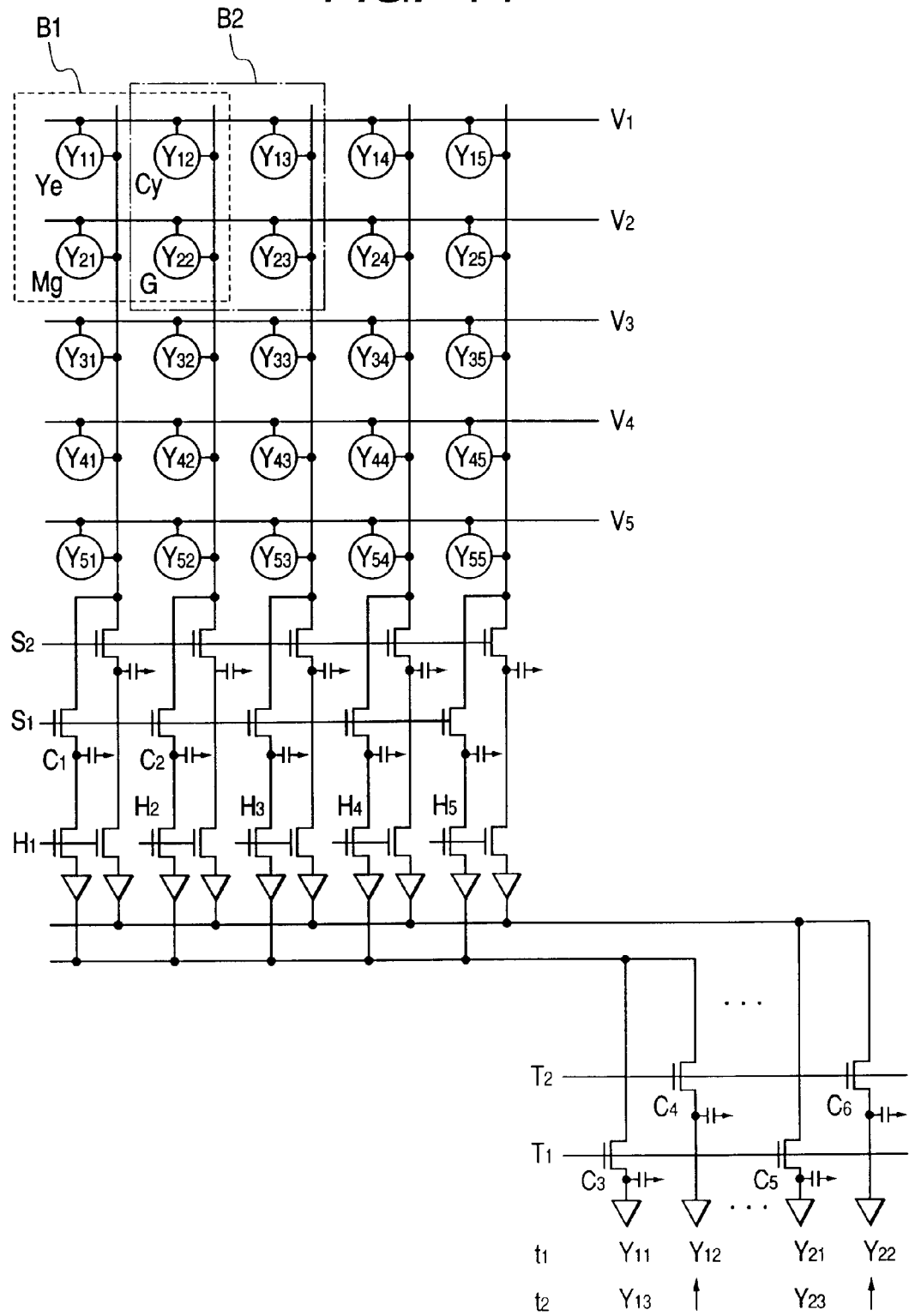
FIG. 14 is a diagram for explaining the circuit structure, according to a sixth embodiment of the present invention, of an image pickup apparatus that performs overlap reading.

FIG. 14 is a diagram showing the outline according to this embodiment of the most characteristic circuit structure of the image pickup unit 710, of the image pickup apparatus 700 in FIG. 3, for reading signals every four pixel blocks. FIG. 13 is a timing chart of the operating timings for the individual sections of the image pickup unit 710.

Figure 15:
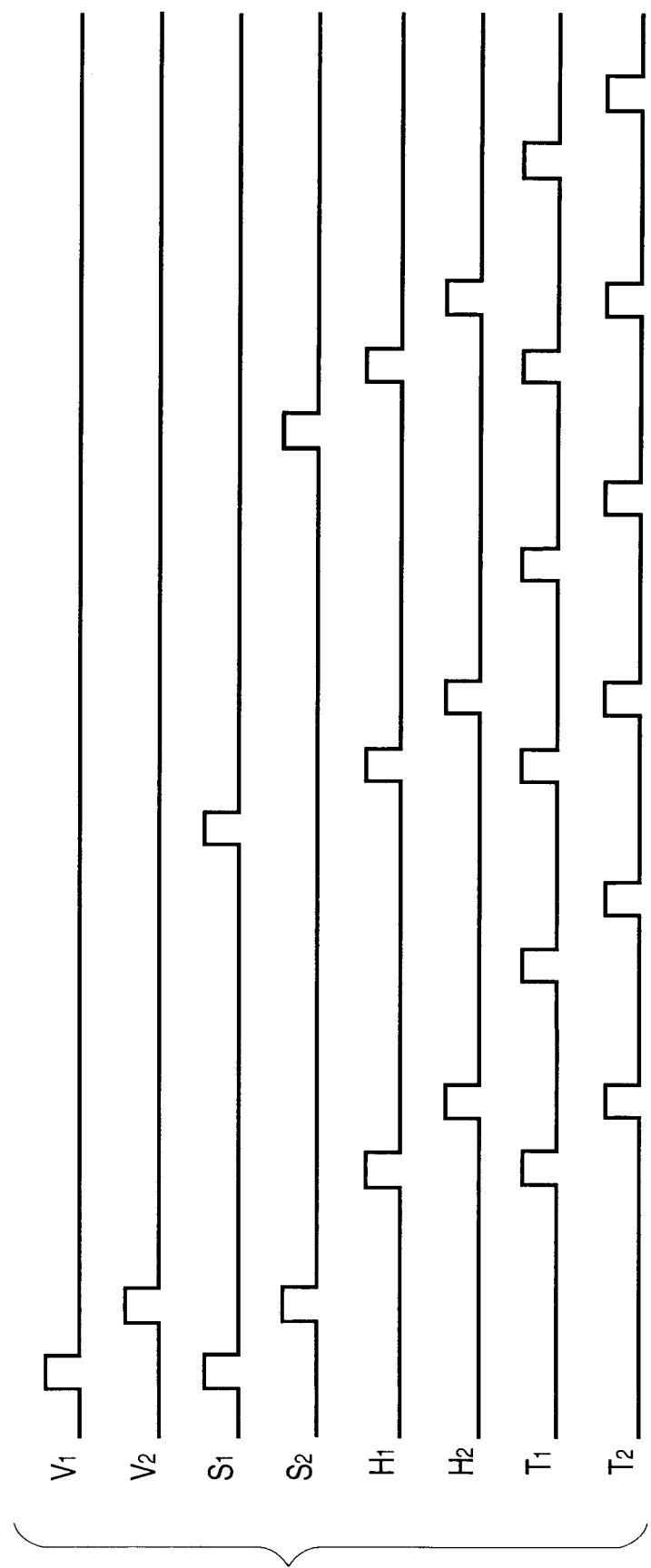
FIG. 15 is a diagram for explaining the processing performed by the image pickup apparatus having the above circuit structure.

As is shown in FIGS. 14 and 15, when the image pickup unit 710 receives gate pulse $S_1$, at the timing at which vertical scan pulse $V_1$ is provided, pixel signal $Y_{11}$ is read (a signal $Y_{12}$ is read in the same manner), and is stored in memory capacitor $C_1$. When gate pulse $S_2$ is received at the timing at which vertical scan pulse $V_2$ is provided, pixel signal $Y_{21}$ is read (a signal $Y_{22}$ is read in the same manner), and is stored in memory capacitor $C_2$.

Then, upon receiving gate pulse $H_1$, pixel signals $Y_{11}$ and $Y_{21}$ are read from memory capacitor $C_1$.

Pixel signals Y12 and Y22 are read in the same manner. And pixel signal $Y_{11}$ is stored on memory capacitor $C_3$, pixel signal $Y_{12}$ is stored on memory capacitor $C_4$, pixel signal $Y_{21}$ is stored on memory capacitor $C_5$, and pixel signal $Y_{22}$ is stored on memory capacitor $C_6$.

When gate pulse $T_1$ is provided at time $t_1$, pixel signals $Y_{11}$, $Y_{12}$, $Y_{21}$ and $Y_{22}$, which are stored on the memory capacitors $C_3$ to $C_6$, are output in parallel and at the same time.

When at time $t_2$ gate pulse $T_2$ is received, pixel signals $Y_{13}$ $Y_{12}$, $Y_{23}$ and $Y_{22}$ for one block, which are shifted horizontally one pixel, are output in parallel. In this case, pixel signals $Y_{12}$ and $Y_{22}$ are output by memory capacitors $C_4$ and $C_6$.

As is described above, according to this embodiment, pixel signals $Y_{12}$ and $Y_{22}$, which are stored in memory capacitors $C_4$ and $C_6$ during the reading of the preceding pixel block B1, i.e., signals obtained from pixels that exist in the portion wherein pixel blocks B1 and B2 overlap, are read for the succeeding pixel block B2. At this time, to read signals for each pixel block, the succeeding pixel block B2 that is to be read is horizontally shifted one pixel away from preceding pixel block B1.

With this arrangement, the following effects can be obtained.

Figure 16:
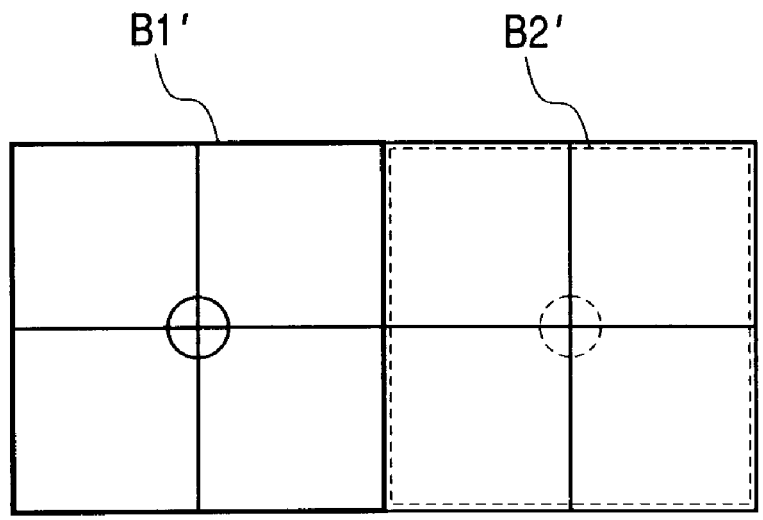
FIG. 16 ia a diagram for explaining a luminance signal and a color signal that are obtained from pixel signals when the overlap reading is not performed.
Figure 17:
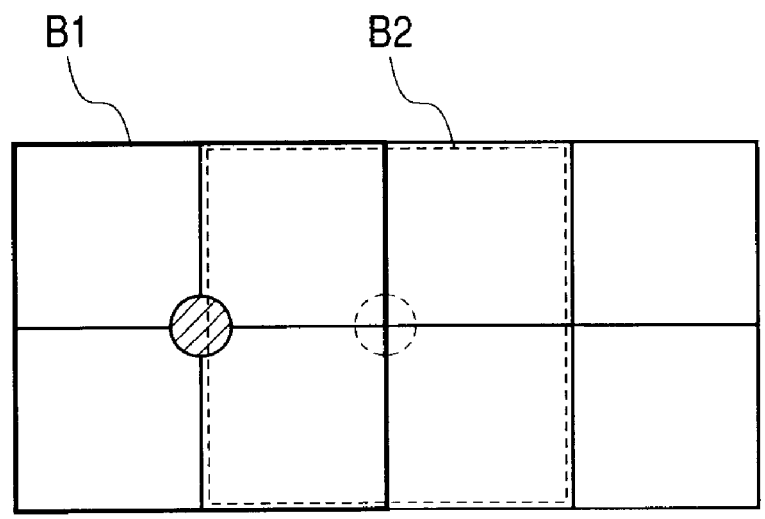
FIG. 17 is a diagram for explaining a luminance signal and a color signal that are obtained from pixel signals when the overlap reading is performed.

In the first to fifth embodiments, as is shown in FIG. 16, pixel block B2', which is to be read next, is closely adjacent to pixel block B1', which was read previously. Therefore, the pixel signals that are obtained are luminance signal Y and color signals CB and CR for every other pixel horizontally or vertically in the pixel unit. In the sixth embodiment, as is shown in FIG. 17, pixel block B2 to be read next overlaps the preceding pixel block B1, so that the pixel signals obtained are luminance signals Y and color signals CB and CR that correspond to individual horizontal pixels in the pixel unit. Therefore, the horizontal resolution can be doubled.

In addition, two (see arrows in FIG. 14) of the four capacitors $C_3$, $C_4$, $C_5$ and $C_6$ are used as storage means for storing pixels that were previously read, and the pixel signals stored therein are output as pixel signals for a pixel block to be read next. As a result, without an external memory being required, pixel signals can be obtained for each pixel block that has been shifted one pixel.

Further, since the output for each pixel block that has been shifted one pixel is obtained inside the image pickup unit 710 (in the same device), the signals can be output at a high speed.

Since a 2×2 pixel block is employed as the unit to be read, two of four capacitors are employed as storage means for storing pixel signals that were previously read. If, for example, a 4×4 pixel block is used as the unit to be read, 12 capacitors must be provided as storage means. That is, when N×(N−1) storage means are provided for an N×N pixel block, as the unit to be read, signals can be read for each N×N pixel block, as well as for each 2×2 pixel block, while having been horizontally shifted one pixel.

The arrangement used for the horizontal reading is employed for vertical reading, and the vertical resolution can be increased by reading signals for each pixel block while a one pixel shift is performed.

In addition, with a noise removal function, a more desirable image signal can be obtained.

Figure 18:
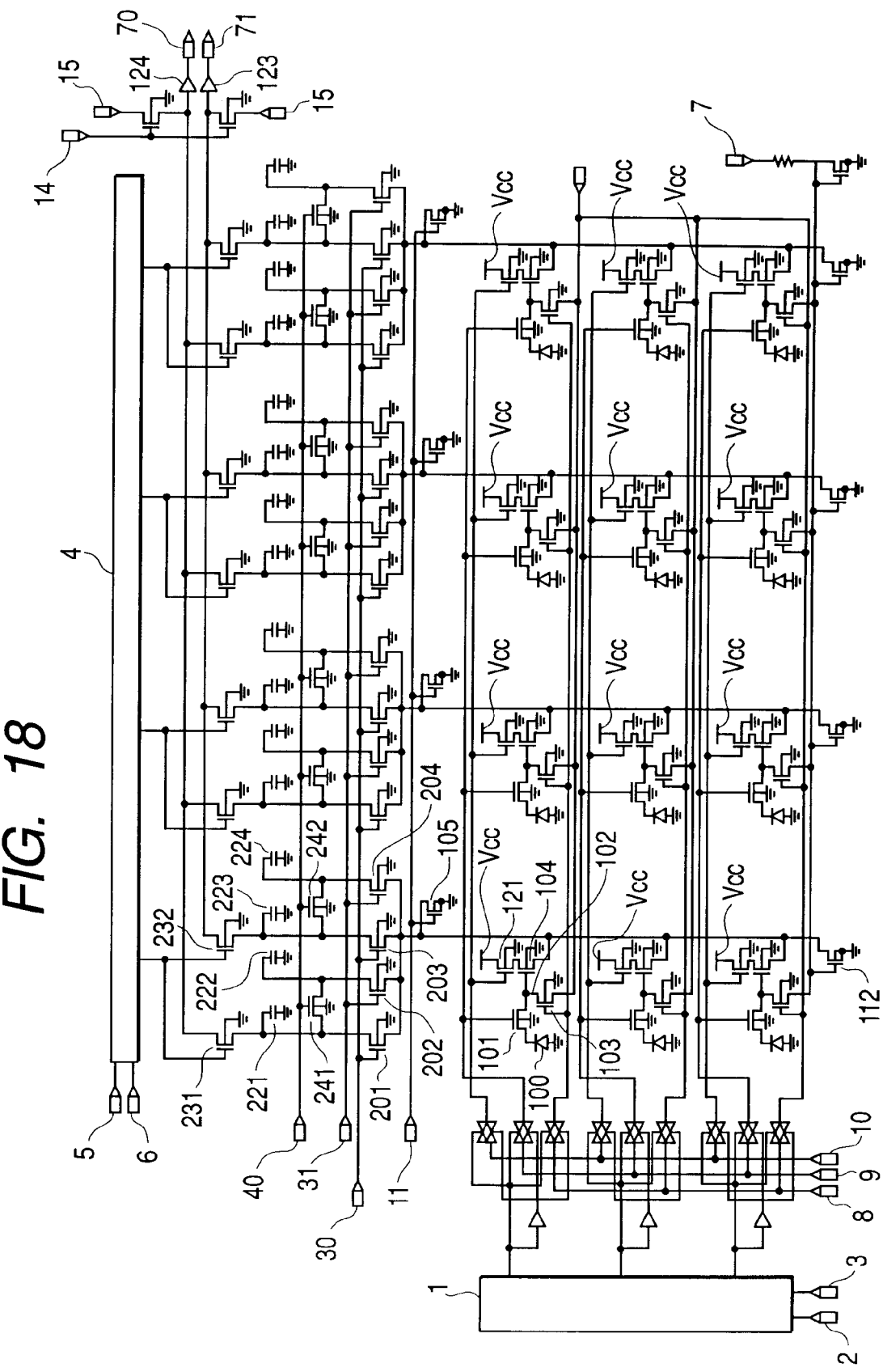
FIG. 18 is a diagram for explaining an example circuit structure that better embodies the image pickup apparatus.
Figure 19:
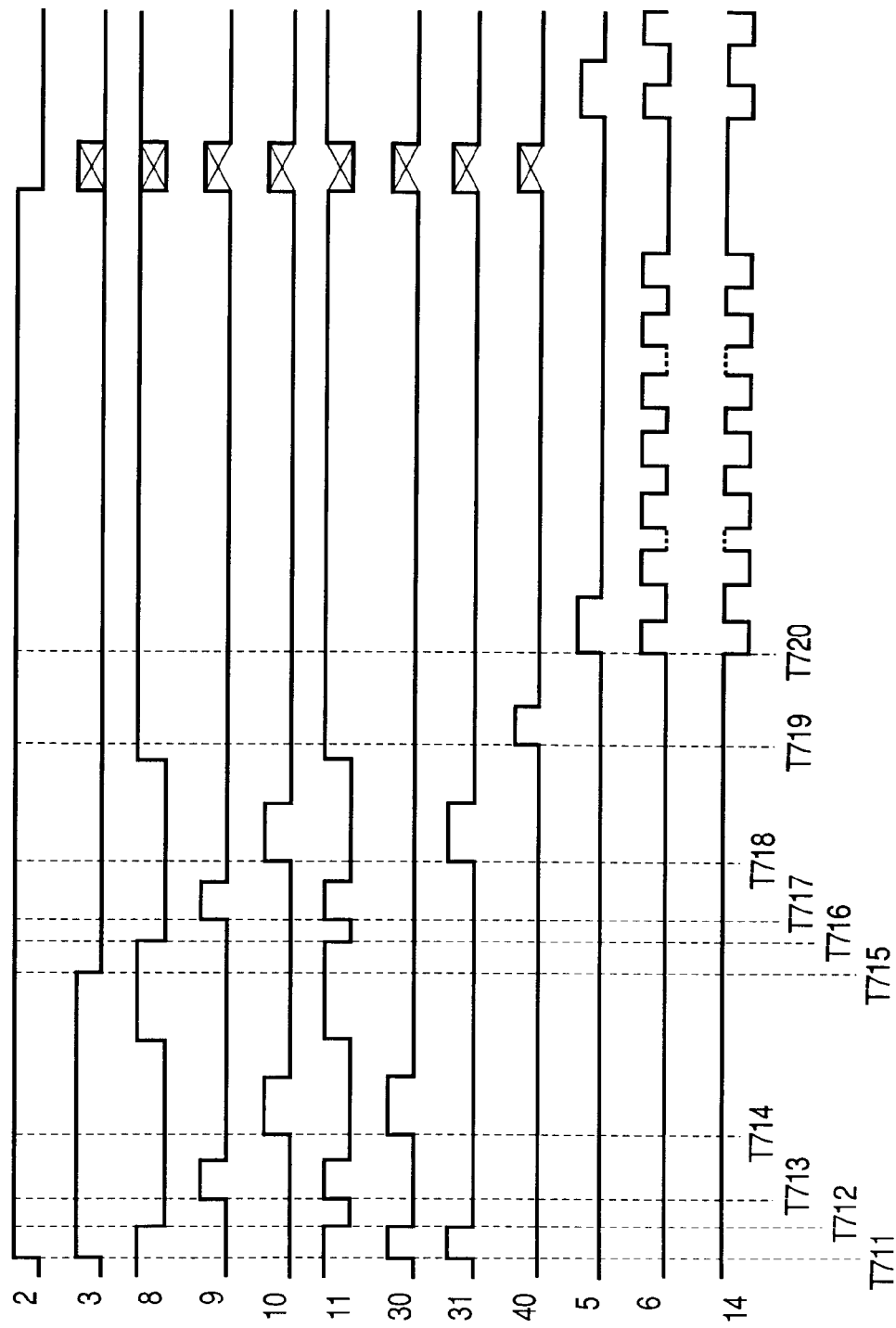
FIG. 19 is a diagram for explaining the processing performed by the image pickup apparatus having the circuit structure in FIG. 18.
Figure 20:
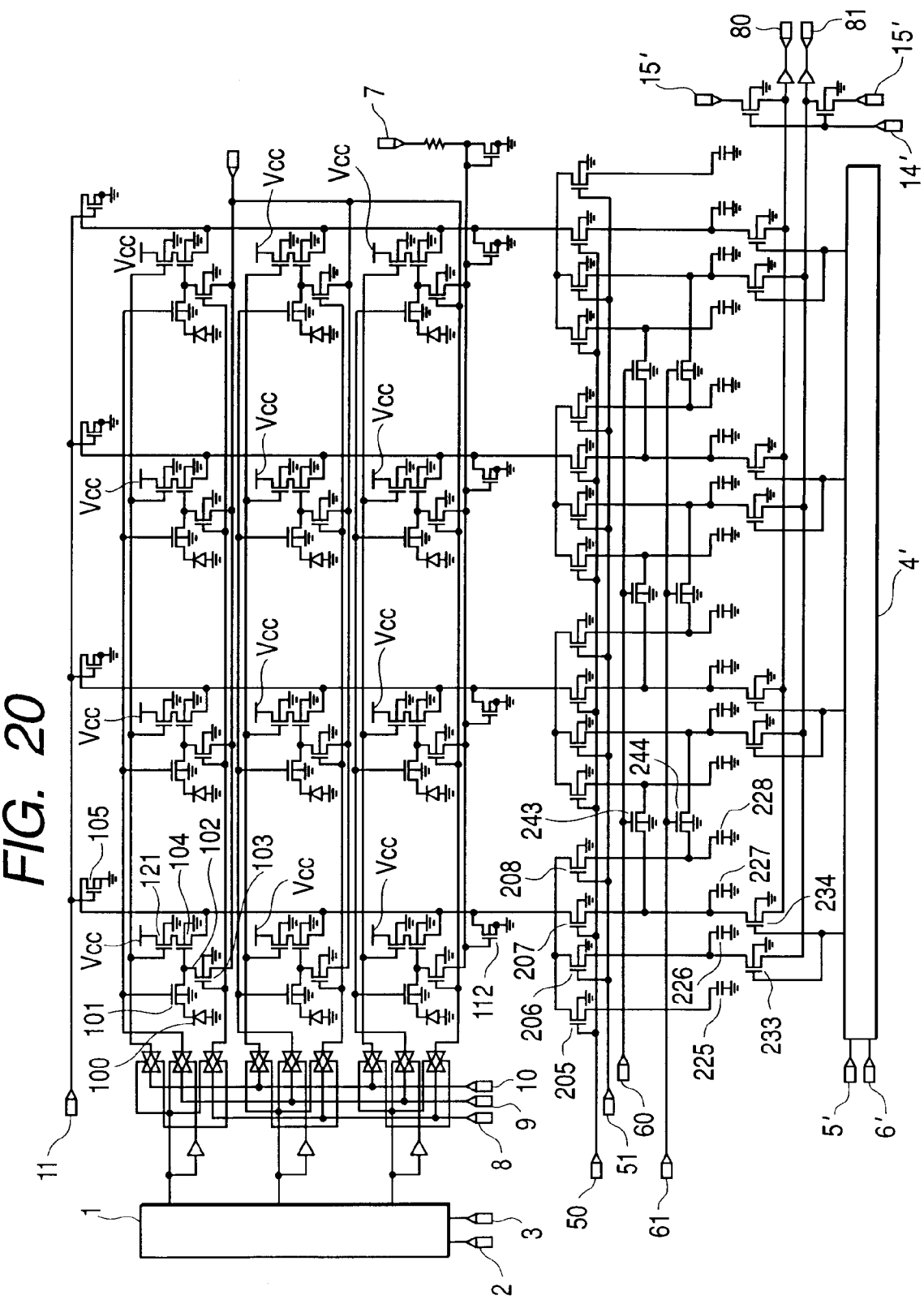
FIG. 20 is a diagram for explaining another example circuit structure that better embodies the image pickup apparatus.
Figure 21:
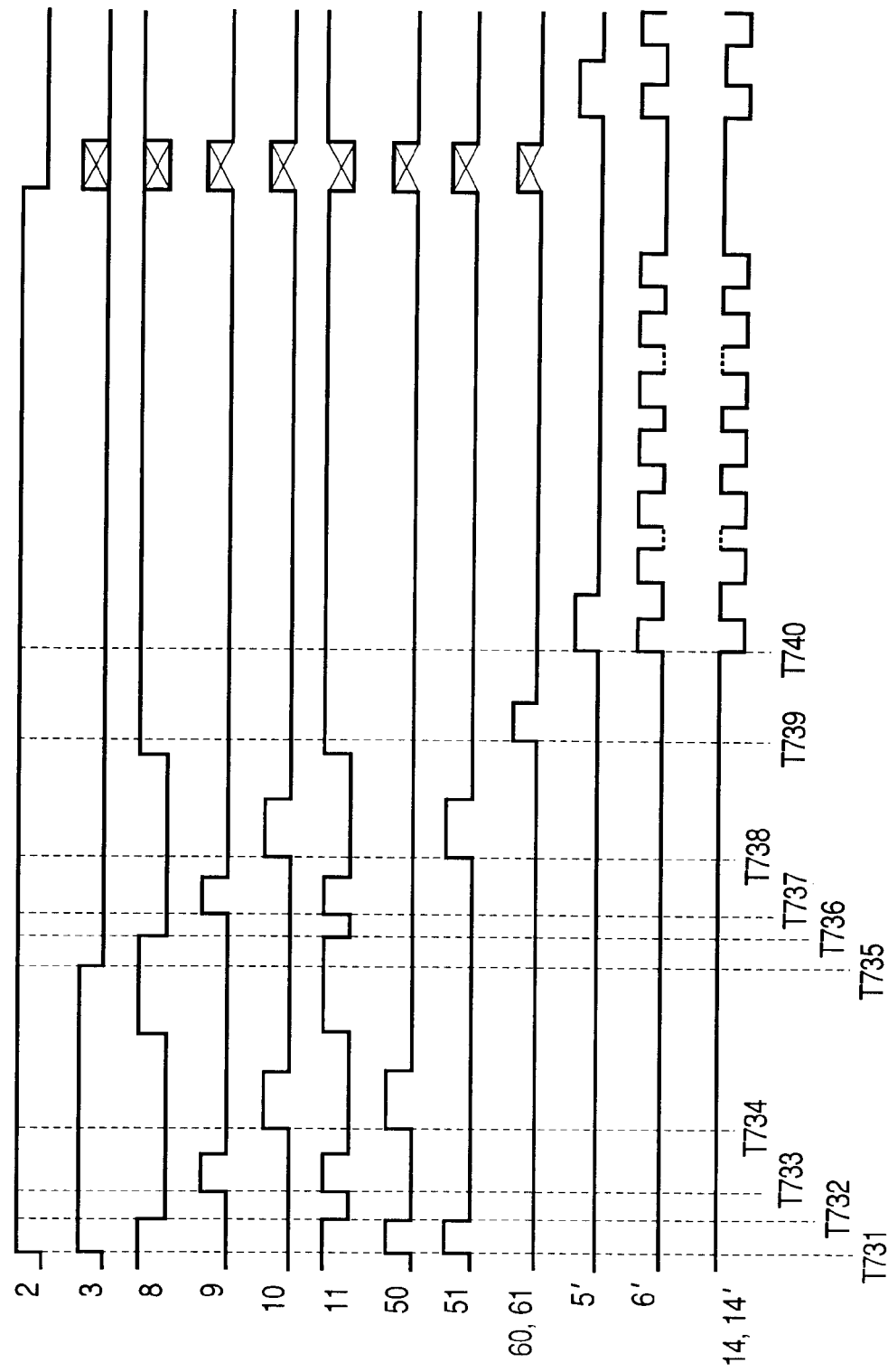
FIG. 21 is a diagram for explaining the processing performed by the image pickup apparatus having the circuit structure in FIG. 20.

FIGS. 18 and 20 are diagrams showing example circuit structures ([Example 1] and [Example 2]) for the image pickup apparatus 700 that better implements the above embodiment. FIGS. 19 and 21 are timing charts showing operating timings for the circuits in FIGS. 18 and 20, respectively.

The circuit structures and operations for [Example 1] and [Example 2] will now be described.

It should be noted that, as well as in the third to fifth embodiments, a CMOS sensor is employed as the image pickup apparatus 700 for the circuit structures in FIGS. 18 and 20 (the image pickup apparatus 700 is also hereinafter referred to as "the CMOS sensor 700"). The same reference numerals as used in FIG. 8 are also used to denote corresponding or identical components in the arrangements in FIGS. 18 and 20, and no detailed explanation will be given for them.

EXAMPLE 1

The CMOS sensor 700 in FIG. 18 can compute vertical pixel signals to obtain color signal CB, and can perform the above calculation for each column, such as for the first, the second, the second, the third, the third or the fourth.

In the CMOS sensor 700, the level of a reset pulse input at a terminal 8 is set HIGH. When at time T711 a start pulse for the vertical scanning circuit 1 input at a terminal 2 and a scan pulse input at a terminal 3 go HIGH, the floating diffusion area in the pixel unit is reset. As a result, the vertical scanning circuit 1 begins scanning and selects the first line (R1). In addition, the pulse input at a terminal 11 also goes HIGH. In this state, when pulses input at terminals 30 and 31 go HIGH, capacitors 221, 222, 223 and 224 that serve as line memories (corresponding to capacitors $C_3$, $C_4$, $C_5$ and $C_6$ in FIG. 14 provided for the respective lines, and hereinafter referred to as "line memories") are reset.

When at time T712 the reset pulse input at the terminal 8 goes LOW, the floating diffusion areas of pixels on the first line are set to the electrically floating state. The line memory is also set to the floating state.

Next, when at time T713 the pulses input at the terminal 9 and 11 go HIGH, the charges are transmitted from the photo detectors on the first line to the floating diffusion areas.

When at time T714 pulses input at the terminals 10, 30 and 50 go HIGH, the charges that were transmitted at time T713 are read for the line memory.

Then, when at time T715 the vertical scan pulse input to the terminal 3 goes LOW, the second line (R2) is selected.

When at time T716 the reset pulse input at the terminal 8 goes LOW, the floating diffusion areas of pixels at the second line are set to the electrically floating state. Accordingly, the line memory is set to the floating state.

When at time T717 the pulses input at the terminals 9 and 11 go HIGH, the charges are transmitted from the photo detectors on the second line to the floating diffusion areas.

When at time T718 the pulses input at the terminals 10, 30 and 50 go HIGH, the charges for the second line that were transmitted at time T717 are read for another line memory (a line memory that differs from the line memory at time T714).

At time T719 the pulse input at the terminal 40 goes HIGH, and a mixed signal for two lines, i.e., for the first and the second lines, is generated in the line memories.

At time T720 the horizontal scanning circuit 4 is activated to read mixed signals from the line memories. The mixed signals for two adjacent columns are output at the same time from the terminals 70 and 71 along two horizontal output lines, and a differential amplifier (not shown) at the succeeding stage performs a subtraction for these signals. As a result, the CMOS sensor 700 directly outputs a color signal. In addition, when the signals received along the two horizontal output lines are added together by an adder (not shown) at the succeeding stage, a luminance signal can also be obtained.

EXAMPLE 2

The CMOS sensor 700 in FIG. 20 can compute vertical pixel signals to obtain color signal CR, and can perform the above calculation for each column, such as for the first, the second, the second, the third, the third or the fourth.

In the CMOS sensor 700, the level of a reset pulse input at a terminal 8 is set HIGH. When at time T731 a start pulse for the vertical scanning circuit 1 input at a terminal 2 and a scan pulse input at a terminal 3 go HIGH, the floating diffusion area in the pixel unit is reset. As a result, the vertical scanning circuit 1 begins scanning and selects the first line (R1). In addition, the pulse input at a terminal 11 also goes HIGH. In this state, when pulses input at terminals 50 and 51 go HIGH, capacitors 225, 226, 227 and 228, which serve as line memories (corresponding to capacitors $C_3$, $C_4$, $C_5$ and $C_6$ in FIG. 14 provided for the respective lines, and hereinafter referred to as "line memories"), are reset.

When at time T732 the reset pulse input at the terminal 8 and the pulses input at the terminals 11, 50 and 51 go LOW, the floating diffusion areas of pixels on the first line are set to the electrically floating state. The line memory is also set to the floating state.

Next, when at time T733 the pulses input at the terminals 9 and 11 go HIGH, the charges are transmitted from the photo detectors on the first line to the floating diffusion areas.

When at time T734 pulses input at the terminals 10 and 50 go HIGH, the charges that were transmitted at time T733 are read for the line memory.

Then, when at time T735 the vertical scan pulse input to the terminal 3 goes LOW, the second line (R2) is selected.

When at time T736 the reset pulse input at the terminal 8 and the pulse input at the terminal 11 go LOW, the floating diffusion areas of pixels on the second line are set to the electrically floating state. Accordingly, the line memory is set to the floating state.

When at time T737 the pulses input at the terminals 9 and 11 go HIGH, the charges are transmitted from the photo detectors on the second line to the floating diffusion areas.

When at time T738 the pulses input at the terminals 10 and 50 go HIGH, the charges for the second line that were transmitted at time T737 are read for another line memory (a line memory that differs from the line memory at time T734).

At time T739 the pulse input at the terminals 60 and 61 go HIGH, and a mixed signal for two lines, i.e., for the first and the second lines, is generated in the line memories.

At time T740 the horizontal scanning circuit 4 is activated to read mixed signals from the line memories. The mixed signals for two adjacent columns are output at the same time from the terminals 70 and 71 along two horizontal output lines, and a differential amplifier (not shown) at the succeeding stage performs a subtraction process for these signals. As a result, the CMOS sensor 700 directly outputs a color difference signal. In addition, when the signals received along the two horizontal output lines are added together by an adder (not shown) at the succeeding stage, a luminance signal can also be obtained.

The arrangements for implementing the calculations for vertical pixel signals have been explained in Examples 1 and 2. When the same arrangement is employed for the calculation of horizontal pixel signals, the calculations for each line, such as the first, the second, the second, the third, the third or the fourth line, can be performed.

Figure 22:
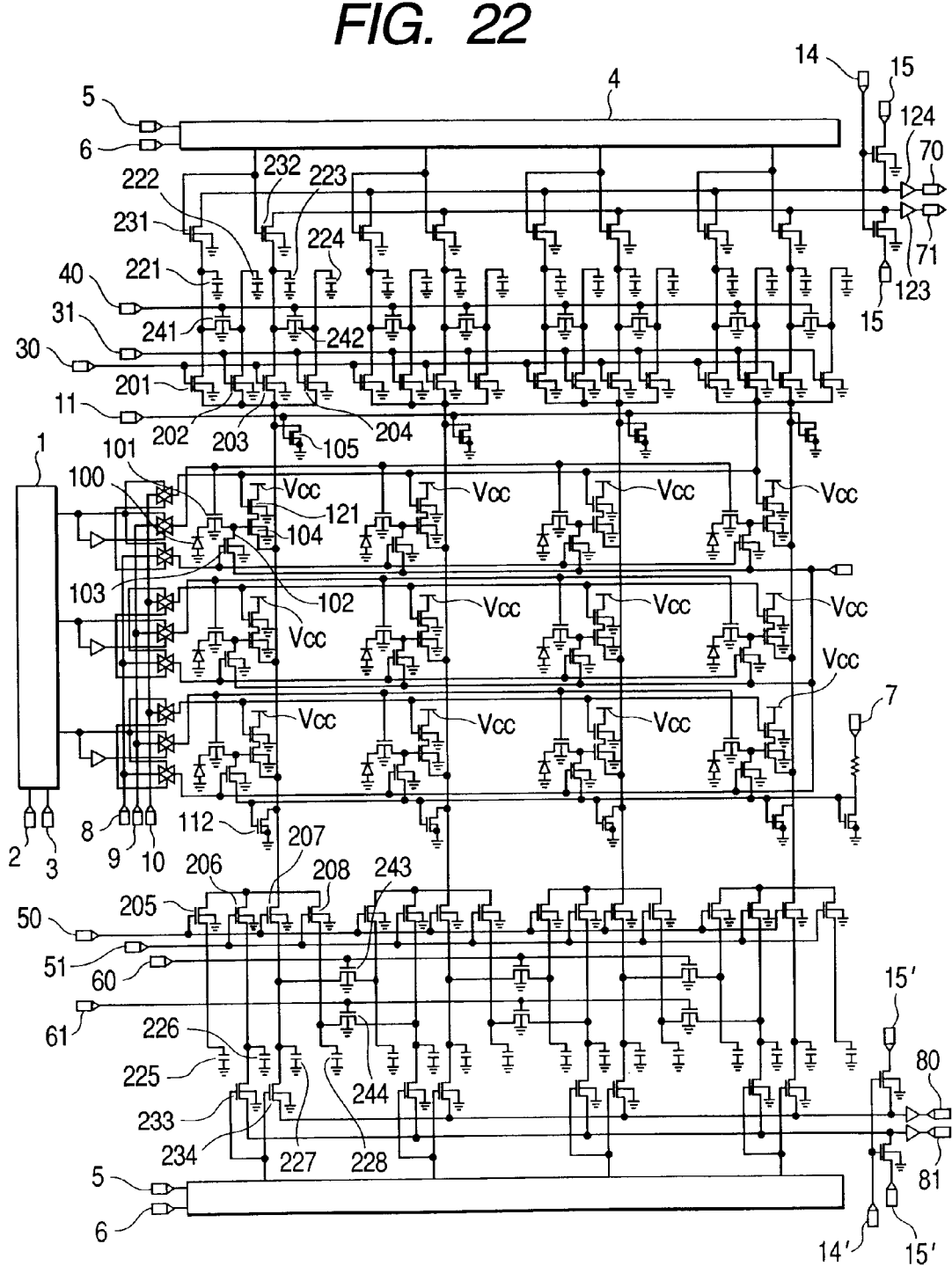
FIG. 22 is a diagram for explaining the circuit structure that has functions of both the circuits shown in FIGS. 18 and 20.
Figure 23:
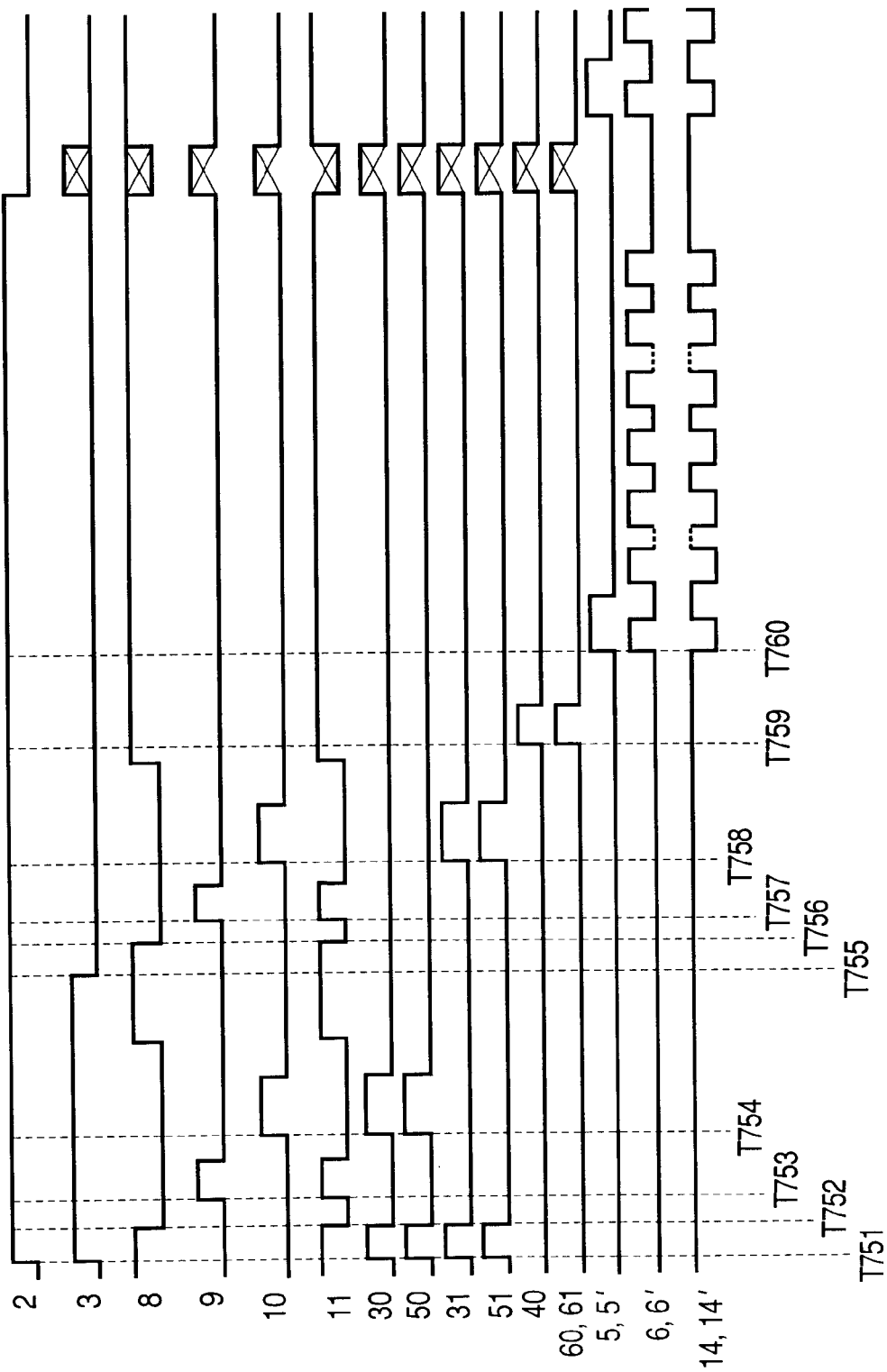
FIG. 23 is a diagram for explaining the processing performed by the image pickup apparatus having the circuit structure in FIG. 22.

In addition, when a circuit shown in FIG. 22 is formed by using both circuit structures in FIGS. 18 and 20, and the operating timing is set as shown in FIG. 23, color difference signals CB and CR can be output at the same time. A luminance signal can also be output at the same time.

In the processing for the CMOS sensor 700 explained while referring to FIGS. 18 to 23, a reset voltage for a floating diffusion area may be read for another line memory before a charge (light signal) for a pixel is read. A variance in an output voltage due to a variance in a threshold voltage of the transistor 104 can be removed by calculating the difference between the reset voltage and the light signal. Therefore, since a noise element that is caused by such a variance is not mixed with a signal that corresponds to the light quantities detected by the photodetectors, signals having a high S/N ratio can be obtained.

The present invention is not limited to the CMOS sensor that has the circuit structure explained in the third to the sixth embodiments, but can also be employed for a CMOS sensor having a different circuit structure. The present invention can also be employed, for example, for a CMD, a BASIS or an SIT image pickup apparatus, and the same effects can be provided as are obtained in the above embodiment.

Seventh Embodiment

Generally, an image signal processing system that processes color image signals first performs predetermined pre-processing for an original signal (pixel signal) that is output by a pixel unit, and generates luminance signal Y and color signals CR and CB. Then, the image signal processing system performs white balance correction, $\gamma$ correction and other color correction for color data by employing the luminance signal Y and color signals CR and CB, and generates a complete luminance signal Y' and color difference signals CR' and CB'. The luminance signal Y' and color difference signals CR' and CB' are used for image processing, such as image compression or expansion, or for a screen display or for recording on a memory medium.

In a seventh embodiment, the present invention is applied for the above described image processing system that processes color image signals.

Figure 24:
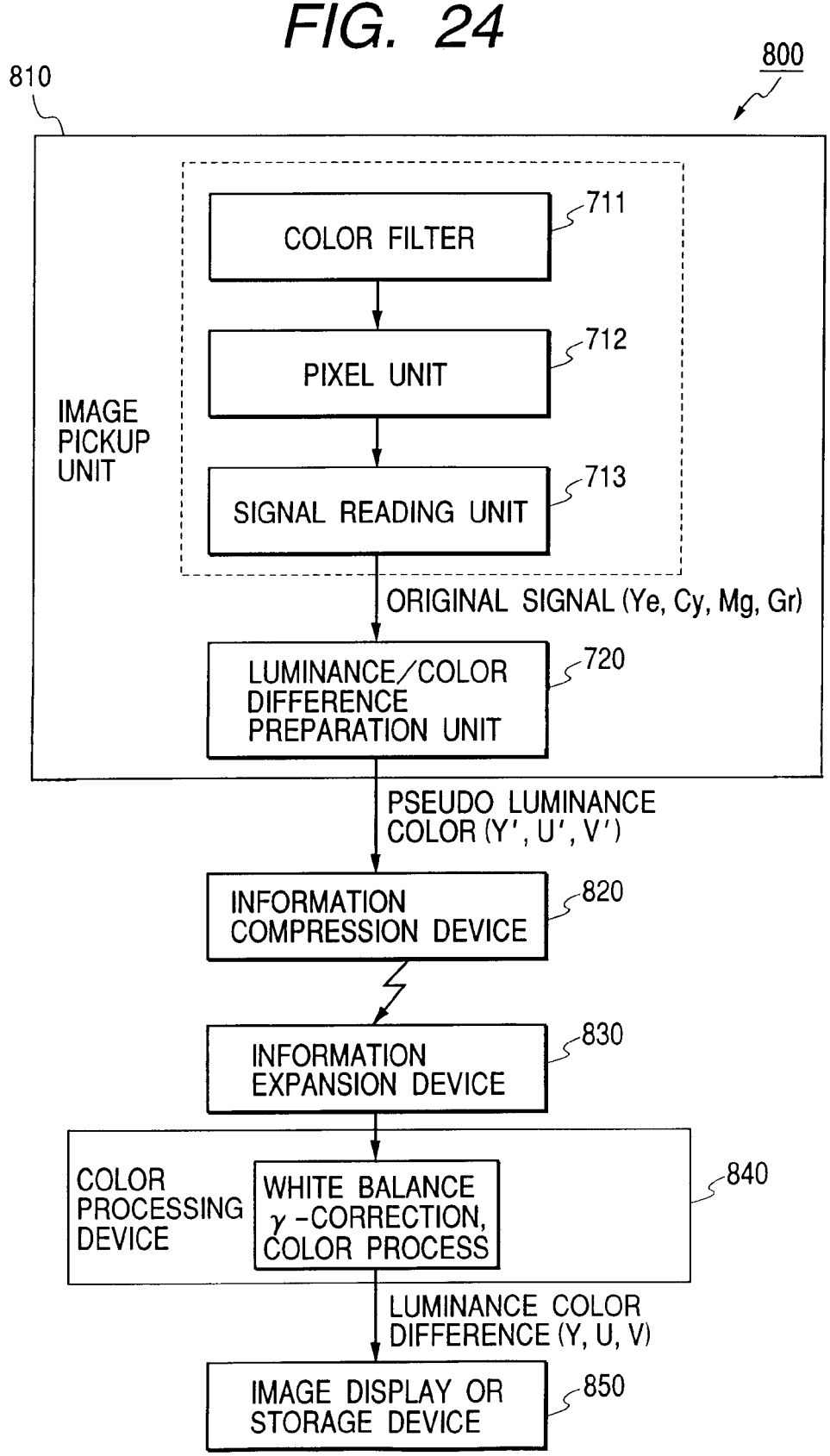
FIG. 24 is a block diagram illustrating the arrangement of an image processing system according to a seventh embodiment of the present invention.

In the image signal processing system according to the present invention, as is shown in FIG. 24, data are exchanged between a transmission side that comprises an image pickup device 810 and an information compression device 820, and a reception side that comprises an information expansion device 830, a color processing device 840 and an image display/storage device 850.

The most important feature of the image signal processing system 800 is the image pickup device 810.

The image pickup device 810 functions the same as the image pickup unit 710 in FIG. 3, and comprises, as is shown in FIG. 3, a color filter 711, a pixel unit 712, a signal reading unit 713 and a luminance/color difference preparation unit 720, all of which are mounted on a single IC chip. Since the luminance/color difference preparation unit 720 is mounted together with the pixel unit 712 on the same IC chip, the load imposed on the processing performed at the succeeding state can be reduced.

The processing performed by the image signal processing system will now be described.

First, on the transmission side the object light is transmitted to the pixel unit 712 through the color filter 711 that has the filter array shown in FIGS. 4 to 7.

Pixel signals (original signals) Ye, Cy, Mg and G obtained at the pixel unit 712 are read by the signal reading unit 713 in the same manner as explained in the first to the sixth embodiments, and are employed by the luminance/color difference preparation unit 720 to generate luminance signal Y and color difference signals CR and CB.

The information compression device 820 employs an information compression technique, such as JPEG, MPEG, H.261 or vector quantization, to compress the luminance signal Y and color difference signals CR and CB that are generated by the image pickup device 810, without performing the white balance or a γ correction for color information.

Specifically, the compression device 820 first performs a DCT (Discrete Cosine Transformation) for each predetermined number of pixel blocks. Then, luminance signal Y and color difference signals CR and CB that were obtained by the DCT are quantized, and compressed data from which high frequency elements have been removed are generated. The compressed data are then encoded. While various encoding methods can be employed, a variable length encoding method for allocating a code length that corresponds to the frequency of the generation of data can be employed to increase the compression rate.

The data that are compressed and encoded by the compression device 820 are transmitted via a medium, such as a communication line, to the information expansion device 830 on the reception side.

On the reception side, the information expansion device 830 performs an inverted DCT and quantization process, which were performed by the compression device 820, for the data received from the transmission side and obtains the luminance signal Y and color signals CR and CB.

The color processing device 840, in order to acquire a satisfactory image quality, performs various color processes, such as white balance correction or γ correction, for the luminance signal Y and color signals CR and CB that are obtained by the information expansion device 830, and generates luminance signal Y' and color difference signals CR' and CB' in their complete forms.

The image display/storage device 850 displays, on a screen, the luminance signal Y' and color signals CR' and CB' generated by the color processing device 840, or stores them in a memory medium.

As is described above, in this embodiment, the filter array shown in FIGS. 4 to 7 is employed for the color filter 711, and pixel signals obtained at the pixel unit 712 are read in the same manner as was explained in the first to the sixth embodiments. As a result, the image processing system that processes color image signals can obtain the same effect as in the first to the sixth embodiments. In other words, color image signals with horizontally and vertically high resolutions can be obtained at a high speed.

In addition, the luminance/color difference preparation unit 720, which generates luminance signal Y and color difference signals CR and CB from original signals Ye, Cy, Mg and G obtained by the pixel unit 712, is mounted together with the pixel unit 712 on the same chip. Therefore, fast calculations for obtaining luminance signal Y and color difference signals CR and CB can be performed, and the image processing, such as image compression and expansion at the succeeding stages, can be performed efficiently.

With the above described arrangement, the increase in the processing speed can also be employed for the improvement of the accuracy of image processing, such as the image compression and expansion, so that a color image signal having a higher image quality can be obtained.

Further, the compression device 820 compresses and encodes luminance signal Y and color signals CR and CB that are received from the image pickup device 810, the information expansion device 830 expands the resultant data, and the color processing device 840 performs color processing, such as white balance correction or γ correction, for the data to obtain a high image quality. Therefore, the deterioration of image quality, which is caused by block noise or high-frequency noise that is generated during the expansion process performed after the compression, can be held to the minimum. As a result, the volume of data to be stored on a memory medium by the image display/storage device 850 or to be transmitted via a communication line can be reduced, and deterioration of the image quality can be prevented so that an image having a high quality can be provided.

In the seventh embodiment, the DCT and the variable length encoding process are used for the compression performed at the compression device 820. However, a code book compression technique (vector quantization technique) can also be employed.

According to the code book compression technique, first, the compression device 820 compares luminance signal Y and color signals CR and CB, which are generated by the image pickup device 810, with a plurality of code books (patterns) that are stored in advance and determines which pattern is the most similar. The compression device 820 then transmits to the expansion device 830 on the reception side a code number that corresponds to the pattern.

The expansion device 830 extracts, from a plurality of code books that are stored in advance, a pattern that corresponds to the code number received from the compression device 820, and reproduces an image signal that was compressed by the compression device 820.

In the above described embodiments, the color filter 711 is a complementary color filter wherein are arranged color filters for four complementary colors, yellow (Ye), magenta (Mg), cyan (Cy) and green (G). The color filter 711, however, is not limited to this type, and any other filter may be employed so long as the luminance signal and color signals can be obtained.

However, when a color filter 711 that is a primary color filter composed of filters having three primary colors, R, G and B, is compared with the color filter 711 that is the complementary color filter that, as in the above embodiments, is composed of filters of four complementary colors, the complementary color filter can provide better effects. This is because all the color filters that constitute the complementary color filter include color components, so that a shortcoming can be prevented whereof a luminance signal and the rate of use of incident light are both low and the sensitivity is reduced.

Further, the objective of the present invention is achieved as follows: a memory medium on which is stored software program code for implementing the functions of a host and a terminal in the previous embodiments is supplied to a system or to an apparatus, and the computer (or a CPU or an MPU) in the system or the apparatus reads the program code from the memory medium.

In this case, the program code read from the memory medium accomplishes the functions of the above described embodiments, and the memory medium on which the program code is stored constitutes the present invention.

A memory medium for supplying such program code can be, for example, a ROM, a floppy disk, a hard disk, an optical disk, a magneto optical disk, a CD-ROM, a CD-R, a magnetic tape, or a nonvolatile memory card.

In addition, the scope of the present invention includes not only a case where the functions in the previous embodiment can be performed when program code is read and executed by the computer, but also a case where, according to an instruction in the program code, an OS running on the computer performs one part, or all, of the actual processing required to accomplish the functions included in the above embodiments.

Furthermore, the present invention includes a case where program code, read from a memory medium, is written in a memory that is mounted on a function expansion board inserted into a computer, or a function expansion unit connected to a computer, and in consonance with program code instructions, a CPU mounted on the function expansion board, or the function expansion unit performs one part, or all, of the actual processing in order to implement the functions included in the above described embodiments.

As is described above, according to the embodiments, a color filter array is so designed that filters for a plurality of colors are sequentially arranged as a unit of N lines and N columns, and that in the cyclic patterned unit of N lines×N columns, the colors of the filters differ from each other not only on the same line but also in the same column.

Therefore, pixel signals that are required to generate a luminance signal and color signals for a predetermined pixel block unit can be obtained for all the pixel blocks, so that a luminance signal and color signals having high resolutions can be generated. When these signals are employed for an easy color display, as automatic focusing detection signals, for the adjustment of white balance or for image compression, a satisfactory color image can be provided.

Specifically, for a color filter array in which, for example, filters for four colors, the first to the fourth color (cyan Cy, yellow Ye, magenta Mg and green G), are arranged as units of 4 lines and 4 columns, filters for the same color do not overlap in the direction of the lines and the columns in a unit of 4 lines and 4 columns, such as first line: first color, second color, third color and fourth color second line: third color, fourth color, first color and second color third line: second color, first color, fourth color and third color, and fourth line: fourth color, third color, second color and first color.

Therefore, the pixel signals for the first to the fourth colors can be obtained from all the pixel block units of 2 lines and 2 columns, i.e., the pixel signals can be obtained that are required for the calculation of a luminance signal and color signals. As a result, the conventional shortcoming whereby the calculations for a luminance signal and color signals can not be performed for a specific line can be resolved.

In addition, when pixel signals obtained from object light that has passed through the color filter array are to be read as a pixel block unit of N lines×N columns, a pixel block to be read next is defined as a block that has been shifted away from a preceding pixel block horizontally or vertically, or both horizontally and vertically, a distance equivalent to a predetermined number of pixels, so that the resolution can be increased.

More specifically, for reading pixel signals as a pixel block unit of 2 lines and 2 columns, first, the first pixel block is read so as to obtain pixel signal $Y_{11}$ on the first line and in the first column, pixel signal $Y_{12}$ on the first line and in the second column, pixel signal $Y_{21}$ on the second line and in the first column, and pixel signal $Y_{22}$ on the second line and in the second column. Among these pixel signals, are stored pixel signals $Y_{12}$ and $Y_{21}$ that are located in portions (the first line and the second column, and the second line and the second column) that overlap a second pixel block that is to be read next (a block that has horizontally been shifted one pixel away from the first pixel block). For reading the following pixel block, these stored pixel signals $Y_{12}$ and $Y_{21}$ are employed as pixel signals for the overlapping areas.

As a result, a luminance signal and color signals that correspond to individual pixels in the horizontal direction can be obtained from the pixel block unit of 2 lines and 2 columns. Therefore, in this case, the horizontal resolution can be doubled.

Further, for each pixel block of 2 lines and 2 columns, a mode (a mode for signal reading method 1) is employed in which, for example, a difference is read between a signal that is obtained by adding a pixel signal on the first line and in the first column to a pixel signal on the first line and in the second column and a signal that is obtained by adding a pixel signal on the second line and in the first column to a pixel signal on the second line and in the second column, and a difference is read between a signal that is obtained by adding a pixel signal on the first line and in the first column to a pixel signal on the second line and in the first column and a signal that is obtained by adding a pixel signal on the first line and in the second column to a pixel signal on the second line and in the second column. Then, a color image signal can be obtained that has color difference signals having high resolutions horizontally and vertically.

In addition, since there are various signal reading methods that employ the same color filter pattern, a multi-mode, such as a mode for outputting at high speed image signals that can be used for an easy color display, for automatic focusing or for automatic white balance, and a mode for outputting image signals having high resolutions, can be coped with.

Furthermore, since a luminance signal and color difference signals are obtained by the image pickup device using the signal reading method described above, and since the data are compressed without performing a color process, such as white balance or γ correction, and the color processing is performed after the expansion of data, data can be compressed efficiently and the deterioration of images after color processing has been performed can be prevented.

What is claimed is:

1. An image pickup apparatus comprising:
   a plurality of pixels arranged horizontally and vertically; and
   a color filter array of four colors arranged in said plurality of pixels,
   wherein said color filter array has a cyclic pattern of adjacent units of four rows×four columns,
   wherein, in the cyclic pattern unit comprising four rows and four columns, colors of color filters on the same row differ from each other and colors of said color filters in the same column differ from each other, and
   wherein when the cyclic pattern unit of four rows and four columns is divided into four subunits, each of which comprises two rows and two columns, colors of the four color filters included in each of said subunits are all different from each other.

2. An image pickup apparatus according to claim 1, further comprising:
   a first addition unit arranged to add signals for pixels that are adjacent to each other horizontally and/or vertically.

3. An image pickup apparatus according to claim 2, further comprising:
   a subtraction unit arranged to perform a subtraction between a plurality of signals that are added together by said first addition unit.

4. An image pickup apparatus according to claim 2, further comprising:

a second addition unit arranged to add together a plurality of signals that are added together by said first addition unit.

5. An image pickup apparatus according to claim 1, further comprising:

a first addition unit arranged to add signals for pixels that are adjacent to each other horizontally and/or vertically;

a subtraction unit arranged to perform a subtraction between a plurality of signals that are added together by said first addition unit; and a second addition unit arranged to add together a plurality of signals that are added together by said first addition unit.

6. An image pickup apparatus according to one of claims 1 to 5, wherein said color filters are a filter for transmitting only green light within a visible radiation range, a filter for absorbing only a blue light within said visible radiation range, a filter for absorbing only green light within said visible radiation range, and a filter for absorbing only red light within said visible radiation range.

* * * * *

UNITED STATES PATENT AND TRADEMARK OFFICE
CERTIFICATE OF CORRECTION

PATENT NO. : 6,757,016 B1
DATED : June 29, 2004
INVENTOR(S) : Isamu Ueno et al.

It is certified that error appears in the above-identified patent and that said Letters Patent is hereby corrected as shown below:

Column 10,
Line 61, "(Cy4+G4)," should read -- (Cy4 + G4),... --.

Column 13,
Line 9, "(Cy4+G4)," should read -- (Cy4 + G4),.... --.

Column 22,
Line 56, "Y12 and Y22" should read -- $Y_{12}$ and $Y_{22}$ --.

Signed and Sealed this

Twelfth Day of October, 2004

JON W. DUDAS
*Director of the United States Patent and Trademark Office*